(12) United States Patent
Corrada-Emmanuel

(10) Patent No.: US 9,646,249 B2
(45) Date of Patent: May 9, 2017

(54) METHOD FOR INFERRING ATTRIBUTES OF A DATA SET AND RECOGNIZERS USED THEREON

(75) Inventor: Andres Corrada-Emmanuel, Easthampton, MA (US)

(73) Assignee: DATA ENGINES CORPORATION, Hatfield, MA (US)

( * ) Notice: Subject to any disclaimer, the term of this patent is extended or adjusted under 35 U.S.C. 154(b) by 696 days.

(21) Appl. No.: 13/989,836

(22) PCT Filed: Dec. 1, 2011

(86) PCT No.: PCT/US2011/062772
§ 371 (c)(1),
(2), (4) Date: Jul. 18, 2013

(87) PCT Pub. No.: WO2012/075221
PCT Pub. Date: Jun. 7, 2012

(65) Prior Publication Data
US 2013/0290236 A1  Oct. 31, 2013

Related U.S. Application Data

(60) Provisional application No. 61/418,627, filed on Dec. 1, 2010, provisional application No. 61/421,542, filed on Dec. 9, 2010, provisional application No. 61/422,440, filed on Dec. 13, 2010.

(51) Int. Cl.
*G06N 5/04* (2006.01)
*G05B 15/02* (2006.01)
*G06N 99/00* (2010.01)

(52) U.S. Cl.
CPC ............... *G06N 5/04* (2013.01); *G05B 15/02* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 7,089,226 B1 * | 8/2006 | Dumais | G06F 17/30705 707/740 |
| 7,983,490 B1 * | 7/2011 | Minter | G06K 9/6226 382/159 |
| 2003/0208289 A1 | 11/2003 | Ben-Arie | |

(Continued)

*Primary Examiner* — Stanley K Hill
*Assistant Examiner* — Benjamin Buss
(74) *Attorney, Agent, or Firm* — Grogan, Tuccillo & Vanderleeden, LLP

(57) ABSTRACT

A method for inferring, without supervision, information about a data set and/or recognizers that are operated thereon. The recognizers are modules that are capable of analyzing, interpreting and labeling raw data of the data set with a label, which is a cognitive or substance-based identifier of the data, for instance, identifying peaks, troughs, patterns and trends of particular significance. The method infers the information about the data set and/or the recognizers based on the observable outputs of each recognizer and a mathematical means of reconciling the agreement/disagreement of the outputs. The method operates without need for knowledge of the correct label to be applied to the data set by each of the recognizers, such as a test set or prior knowledge of the accuracy of the recognizer.

17 Claims, 14 Drawing Sheets

(56) References Cited

U.S. PATENT DOCUMENTS

| | | | |
|---|---|---|---|
| 2005/0091245 A1 | 4/2005 | Chickering et al. | |
| 2005/0154686 A1* | 7/2005 | Corston | G06F 17/30864 706/12 |
| 2005/0213810 A1* | 9/2005 | Sabe | G06K 9/00248 382/159 |
| 2006/0033625 A1* | 2/2006 | Johnson | G06Q 10/10 340/573.1 |
| 2006/0047617 A1* | 3/2006 | Bacioiu | G06K 9/6262 706/59 |
| 2007/0053513 A1 | 3/2007 | Hoffberg | |
| 2007/0061022 A1* | 3/2007 | Hoffberg-Borghesani | G05B 19/0426 700/83 |
| 2007/0271223 A1 | 11/2007 | Zhang et al. | |
| 2009/0132561 A1 | 5/2009 | Cormode et al. | |
| 2009/0216700 A1* | 8/2009 | Bouchard | G06N 99/005 706/46 |
| 2009/0253127 A1 | 10/2009 | Gaudreau et al. | |
| 2010/0063948 A1* | 3/2010 | Virkar | G06N 3/02 706/12 |
| 2010/0171592 A1* | 7/2010 | Kamemaru | H04L 1/0045 340/10.1 |
| 2011/0035347 A1* | 2/2011 | Shama | G06Q 30/02 706/21 |
| 2011/0224565 A1* | 9/2011 | Ong | G06F 19/345 600/509 |

* cited by examiner

|   |   | 60 |   | 72 | 84 |
|---|---|---|---|---|---|
| # | Event | | | Count | Numerator |
| 1 | A | A | A | 179562 | xGA1 xGA2 xGA3 yG12 yG13 yG23 |
| 2 | A | A | C | 7131 | xGA1 xGA2 xGC3 yG12 |
| 3 | A | A | G | 6859 | xGA1 xGA2 xGG3 yG12 |
| 4 | A | A | T | 7103 | xGA1 xGA2 xGT3 yG12 |
| 5 | A | A | N | 6954 | xGA1 xGA2 xGN3 yG12 |
| 6 | A | C | A | 8767 | xGA1 xGA3 xGC2 yG13 |
| 7 | A | C | C | 4825 | xGA1 xGC2 xGC3 yG23 |
| 8 | A | C | G | 746 | xGA1 xGC2 xGG3 |
| 9 | A | C | T | 794 | xGA1 xGC2 xGT3 |
| 10 | A | C | N | 851 | xGA1 xGC2 xGN3 |
| 11 | A | G | A | 8685 | xGA1 xGA3 xGG2 yG13 |
| 12 | A | G | C | 727 | xGA1 xGC3 xGG2 |
| 13 | A | G | G | 5107 | xGA1 xGG2 xGG3 yG23 |
| 14 | A | G | T | 831 | xGA1 xGG2 xGT3 |
| 15 | A | G | N | 825 | xGA1 xGG2 xGN3 |
| 16 | A | T | A | 8949 | xGA1 xGA3 xGT2 yG13 |
| 17 | A | T | C | 713 | xGA1 xGC3 xGT2 |
| 18 | A | T | G | 868 | xGA1 xGG3 xGT2 |
| 19 | A | T | T | 6289 | xGA1 xGT2 xGT3 yG23 |
| 20 | A | T | N | 873 | xGA1 xGN3 xGT2 |
| 21 | A | N | A | 8690 | xGA1 xGA3 xGN2 yG13 |
| 22 | A | N | C | 811 | xGA1 xGC3 xGN2 |
| 23 | A | N | G | 851 | xGA1 xGG3 xGN2 |
| 24 | A | N | T | 868 | xGA1 xGN2 xGT3 |
| 25 | A | N | N | 6841 | xGA1 xGN2 xGN3 yG23 |

| # | Event | | | Count | Numerator |
|---|---|---|---|---|---|
| 26 | C | A | A | 7256 | xGA2 xGA3 xGC1 yG23 |
| 27 | C | A | C | 4254 | xGA2 xGC1 xGC3 yG13 |
| 28 | C | A | G | 740 | xGA2 xGC1 xGG3 |
| 29 | C | A | T | 811 | xGA2 xGC1 xGT3 |
| 30 | C | A | N | 749 | xGA2 xGC1 xGN3 |
| 31 | C | C | A | 5039 | xGA3 xGC1 xGC2 yG12 |
| 32 | C | C | C | 116390 | xGC1 xGC2 xGC3 yG12 yG13 yG23 |
| 33 | C | C | G | 4930 | xGC1 xGC2 xGG3 yG12 |
| 34 | C | C | T | 5024 | xGC1 xGC2 xGT3 yG12 |
| 35 | C | C | N | 4912 | xGC1 xGC2 xGN3 yG12 |
| 36 | C | G | A | 710 | xGA3 xGC1 xGG2 |
| 37 | C | G | C | 4057 | xGC1 xGC3 xGG2 yG13 |
| 38 | C | G | G | 5139 | xGC1 xGG2 xGG3 yG23 |
| 39 | C | G | T | 645 | xGC1 xGG2 xGT3 |
| 40 | C | G | N | 654 | xGC1 xGG2 xGN3 |
| 41 | C | T | A | 783 | xGA3 xGC1 xGT2 |
| 42 | C | T | C | 4127 | xGC1 xGC3 xGT2 yG13 |
| 43 | C | T | G | 684 | xGC1 xGG3 xGT2 |
| 44 | C | T | T | 6254 | xGC1 xGT2 xGT3 yG23 |
| 45 | C | T | N | 752 | xGC1 xGN3 xGT2 |
| 46 | C | N | A | 759 | xGA3 xGC1 xGN2 |
| 47 | C | N | C | 4154 | xGC1 xGC3 xGN2 yG13 |
| 48 | C | N | G | 655 | xGC1 xGG3 xGN2 |
| 49 | C | N | T | 715 | xGC1 xGN2 xGT3 |
| 50 | C | N | N | 6491 | xGC1 xGN2 xGN3 yG23 |

FIG. 8A

|  60 | 72 | 84 |
|---|---|---|

| # | Event | | | Count | Numerator |
|---|---|---|---|---|---|
| 51 | G | A | A | 7293 | xGA2 xGA3 xGG1 yG23 |
| 52 | G | A | C | 758 | xGA2 xGC3 xGG1 |
| 53 | G | A | G | 4412 | xGA2 xGG1 xGG3 yG13 |
| 54 | G | A | T | 814 | xGA2 xGG1 xGT3 |
| 55 | G | A | N | 852 | xGA2 xGG1 xGN3 |
| 56 | G | C | A | 740 | xGA3 xGC2 xGG1 |
| 57 | G | C | C | 4561 | xGC2 xGC3 xGG1 yG23 |
| 58 | G | C | G | 4108 | xGC2 xGG1 xGG3 yG13 |
| 59 | G | C | T | 672 | xGC2 xGG1 xGT3 |
| 60 | G | C | N | 622 | xGC2 xGG1 xGN3 |
| 61 | G | G | A | 5085 | xGA3 xGG1 xGG2 yG12 |
| 62 | G | G | C | 4928 | xGC3 xGG1 xGG2 yG12 |
| 63 | G | G | G | 110347 | xGG1 xGG2 xGG3 yG12 yG13 yG23 |
| 64 | G | G | T | 5018 | xGG1 xGG2 xGT3 yG12 |
| 65 | G | G | N | 5104 | xGG1 xGG2 xGN3 yG12 |
| 66 | G | T | A | 792 | xGA3 xGG1 xGT2 |
| 67 | G | T | C | 657 | xGC3 xGG1 xGT2 |
| 68 | G | T | G | 4227 | xGG1 xGG3 xGT2 yG13 |
| 69 | G | T | T | 6078 | xGG1 xGT2 xGT3 yG23 |
| 70 | G | T | N | 707 | xGG1 xGN3 xGT2 |
| 71 | G | N | A | 780 | xGA3 xGG1 xGN2 |
| 72 | G | N | C | 655 | xGC3 xGG1 xGN2 |
| 73 | G | N | G | 4112 | xGG1 xGG3 xGN2 yG13 |
| 74 | G | N | T | 744 | xGG1 xGN2 xGT3 |
| 75 | G | N | N | 6631 | xGG1 xGN2 xGN3 yG23 |

| # | Event | | | Count | Numerator |
|---|---|---|---|---|---|
| 76 | T | A | A | 7216 | xGA2 xGA3 xGT1 yG23 |
| 77 | T | A | C | 756 | xGA2 xGC3 xGT1 |
| 78 | T | A | G | 846 | xGA2 xGG3 xGT1 |
| 79 | T | A | T | 7577 | xGA2 xGT1 xGT3 yG13 |
| 80 | T | A | N | 918 | xGA2 xGN3 xGT1 |
| 81 | T | C | A | 772 | xGA3 xGC2 xGT1 |
| 82 | T | C | C | 4582 | xGC2 xGC3 xGT1 yG23 |
| 83 | T | C | G | 645 | xGC2 xGG3 xGT1 |
| 84 | T | C | T | 7301 | xGC2 xGT1 xGT3 yG13 |
| 85 | T | C | N | 760 | xGC2 xGN3 xGT1 |
| 86 | T | G | A | 807 | xGA3 xGG2 xGT1 |
| 87 | T | G | C | 592 | xGC3 xGG2 xGT1 |
| 88 | T | G | G | 5238 | xGG2 xGG3 xGT1 yG23 |
| 89 | T | G | T | 7423 | xGG2 xGT1 xGT3 yG13 |
| 90 | T | G | N | 713 | xGG2 xGN3 xGT1 |
| 91 | T | T | A | 6827 | xGA3 xGT1 xGT2 yG12 |
| 92 | T | T | C | 6722 | xGC3 xGT1 xGT2 yG12 |
| 93 | T | T | G | 6828 | xGG3 xGT1 xGT2 yG12 |
| 94 | T | T | T | 190808 | xGT1 xGT2 xGT3 yG12 yG13 yG23 |
| 95 | T | T | N | 6772 | xGN3 xGT1 xGT2 yG12 |
| 96 | T | N | A | 799 | xGA3 xGN2 xGT1 |
| 97 | T | N | C | 693 | xGC3 xGN2 xGT1 |
| 98 | T | N | G | 728 | xGG3 xGN2 xGT1 |
| 99 | T | N | T | 7366 | xGN2 xGT1 xGT3 yG13 |
| 100 | T | N | N | 6543 | xGN2 xGN3 xGT1 yG23 |

FIG. 8B

|  |  | 60 |  | 72 | 84 |
|---|---|---|---|---|---|
| # | Event | | | Count | Numerator |
| 101 | N | A | A | 7471 | xGA2 xGA3 xGN1 yG23 |
| 102 | N | A | C | 752 | xGA2 xGC3 xGN1 |
| 103 | N | A | G | 776 | xGA2 xGG3 xGN1 |
| 104 | N | A | T | 872 | xGA2 xGN1 xGT3 |
| 105 | N | A | N | 5480 | xGA2 xGN1 xGN3 yG13 |
| 106 | N | C | A | 771 | xGA3 xGC2 xGN1 |
| 107 | N | C | C | 4542 | xGC2 xGC3 xGN1 yG23 |
| 108 | N | C | G | 657 | xGC2 xGG3 xGN1 |
| 109 | N | C | T | 694 | xGC2 xGN1 xGT3 |
| 110 | N | C | N | 5368 | xGC2 xGN1 xGN3 yG13 |
| 111 | N | G | A | 778 | xGA3 xGG2 xGN1 |
| 112 | N | G | C | 647 | xGC3 xGG2 xGN1 |
| 113 | N | G | G | 5273 | xGG2 xGG3 xGN1 yG23 |
| 114 | N | G | T | 741 | xGG2 xGN1 xGT3 |
| 115 | N | G | N | 5375 | xGG2 xGN1 xGN3 yG13 |
| 116 | N | T | A | 872 | xGA3 xGN1 xGT2 |
| 117 | N | T | C | 681 | xGC3 xGN1 xGT2 |
| 118 | N | T | G | 733 | xGG3 xGN1 xGT2 |
| 119 | N | T | T | 6283 | xGN1 xGT2 xGT3 yG23 |
| 120 | N | T | N | 5453 | xGN1 xGN3 xGT2 yG13 |
| 121 | N | N | A | 5671 | xGA3 xGN1 xGN2 yG12 |
| 122 | N | N | C | 5656 | xGC3 xGN1 xGN2 yG12 |
| 123 | N | N | G | 5578 | xGG3 xGN1 xGN2 yG12 |
| 124 | N | N | T | 5668 | xGN1 xGN2 xGT3 yG12 |
| 125 | N | N | N | ** | xGN1 xGN2 xGN3 yG12 yG13 yG23 |
| Total | | | | 999,925 | |

FIG. 8C

METHOD FOR INFERRING ATTRIBUTES OF A DATA SET AND RECOGNIZERS USED THEREON

CROSS REFERENCE TO A RELATED APPLICATION

This application is entitled to the benefit of and incorporates by reference essential subject matter disclosed in International Application No. PCT/US2011/062772 filed on Dec. 1, 2011 and is related to provisional U.S. Patent Application Ser. No. 61/418,627, filed on Dec. 1, 2010, which is hereby incorporated by reference; provisional U.S. Patent Application Ser. No. 61/421,542, filed on Dec. 9, 2010, which is hereby incorporated by reference; and provisional U.S. Patent Application Ser. No. 61/422,440, filed on Dec. 13, 2010, which is hereby incorporated by reference.

FIELD OF THE INVENTION

The present invention generally relates to a method for inferring attributes of a data set and/or recognizers used on the data set and, more specifically, to a method for inferring a frequency of labels of the data set, a confidence of the labels, an accuracy of the recognizers, an error rate of the recognizers and, in the case of a sequential data set, the length of the data set, without knowledge of the correct labels to apply to the data set.

BACKGROUND OF THE INVENTION

Data is abundant in many fields, including science, engineering, medicine, insurance, information systems and the like. Labeling the data is a common task that precedes further use of the same. For instance, data may be inputted from a sensor in an analog format and converted into a digital format or directly in a digital format. Otherwise, the data may be inputted in a raw format from a database. Then, the data is analyzed and labeled by a recognizer. By "labeled" it is meant that the recognizer applies cognitive or substance based identifiers to the data, for instance, to identify peaks, troughs, patterns and trends of particular significance.

A non-exhaustive and non-limiting list of recognizers include fluorescent dye detection software for deoxyribonucleic acid (DNA) sequencer assays, fingerprint detection and identification software, voice recognition and identification software, speech recognition software, facial recognition and identification software, optical character recognition software, part of speech taggers in natural language processing, document relevance determination in an information retrieval setting and quantitative analysis software for investing, finance and the like.

The characteristics and attributes of the data set (e.g., a length of the data set and an observed frequency of each label in the data set) are estimated based on the output of the recognizer. For instance, the output of the recognizer can be tallied and this crude count forms the estimate of the attributes of the data set. However, it is nearly impossible to tell whether or not these characteristics and attributes are actually correct. Even if a human manually reviews the labeled data set, there is no way to know whether the correct label has been applied. Additionally, there are many issues with manually reviewing the labeled data set, including the time and cost of performing the review.

It is for these reasons that computers are often employed to label the data in the first place because the computer will behave quickly, with reduced expense and precisely (i.e., consistently, whether right or wrong). Additionally, the criteria of comparison may be difficult to present for human review, but more readily coded for computer-based analysis (e.g., if the difference between two or more labels is not readily perceivable by a human judge).

If multiple recognizers are available, the outputs of each recognizer can be averaged to better approximate the characteristics and attributes of the data set. For example, if numerous recognizers apply the same label to a data point of a data set and/or the number of recognizers is increased, then the certainty that the label is correct increases. Unfortunately, the number of recognizers may be limited. For instance, there may not be a sufficient number of recognizers available to correct the data to within a desired level of accuracy (e.g., below a 1% error rate). Alternatively, the cost of using additional recognizers may be prohibitive, thereby constructively limiting the number of recognizers that are available for use.

If the accuracy of each recognizer is known, the correct characteristics and attributes of the data can be better approximated using a weighted average. Unfortunately, the accuracy of each recognizer may be unknown or prohibitive to determine. Known techniques for determining the accuracy of a recognizer involve manually reviewing the output from the recognizer or comparing the output to a test set, which is time consuming and costly.

Further, the accuracy of each recognizer may vary across different subsets of data. This variability skews the weighted average by relying upon an incorrect or overly simplified statement of the accuracy of the recognizer. If the circumstance of the subset of data were known, then it would be possible to account for this variability. However, assessing the circumstance of the subset of data suffers from the same problems as manually reviewing the output.

Other known techniques for determining the accuracy of a recognizer involve automatic comparisons performed using test sets in which correct values of the test set are presumed or known to be correct (i.e., staged data having labels defined as correct). These techniques fail when no test set is available.

In U.S. Patent Publication 2009/0080731 entitled "System and Method for Multiple Instance Learning For Computer Aided Diagnosis" a system and method determines the maximum likely inference of the accuracy of medical labels utilized in cancer stage cells of an image. However, the technique does not rely on the frequency of label voting patterns and such as system would be advantageous commercially. As a result, there is a need for techniques to automatically assess the attributes of the data set and/or the recognizer used thereon where the correct label of the data points of the data set are unknown (i.e., in an unsupervised context).

Knowledge of the correct label enables calculations to be made concerning relevant statistics of the data and/or the performance of the recognizers, such as the prevalence of correct labels in the data set and the accuracy of the recognizer. Knowledge of the accuracy of the recognizer, in turn, enables the prevalence of correct labels to be calculated.

However, there are no known techniques to calculate or infer the prevalence of the labels and the accuracy of the recognizers when the correct label(s) of the data point of the data set is unknown. A system to infer the p of labels and accuracy of the recognizers would be advantageous commercially, satisfy a long-felt need, having widespread application in diverse fields.

In the distinct field of automated decision making, such as, for example, in the field known as ensemble methods for decision, computers make decisions based on data sets as well as the outputs of recognizers applied thereto. The known techniques of automated decision making are designed such that ambiguities or imperfections in the data set or the output of the recognizers are incorporated within an acceptable margin of error, approximated (i.e., rounded using thresholds), overlooked or otherwise ignored, which enables operation in a best-efforts manner given the inherent deficiencies of the data set and the recognizers in a non-ideal context (i.e., real world application).

However, the known techniques of automated decision making do not improve or expand upon the known information concerning the data set or the recognizers. Additionally, the field of automated decision making is not concerned with determining the attributes of the data set and the recognizers in any way.

The object of the present invention is, therefore, to infer attributes of the data set and the recognizer used thereon, which, among other desirable attributes, significantly reduces or overcomes the above-mentioned deficiencies of previous techniques.

SUMMARY OF THE INVENTION

Accordingly, the present invention provides a method and system for inferring the character and attributes of a data set and/or recognizers used on the same. The term "infer" means that the character and attributes of the data set and/or the recognizers are determined without prior-knowledge of either the correct values or other attributes of the data set or the accuracy or other attributes of the recognizers, and the determination is made without the need for supervision, such as human review of the data set and the labels applied to the data set by the recognizers, or the use of test sets.

It is an object of the present invention that the character and attributes of the data set that are inferred include a prevalence of each label in the data set, a confidence measure of each label applied by each of the plurality of recognizers and, in the case of sequential data points, a correct length of the data sequence when substitution, deletion and insertion errors are made by the recognizers.

It is an object of the present invention that the character and attributes of the recognizers that are inferred include an accuracy of each recognizer in applying each label, an error rate (i.e., insertion, substitution and deletion error rates) of each recognizer and a conditional probability of each recognizer producing a particular labeling pattern for each label.

In one embodiment of the present invention, a method is provided for executing a computer program using a processor of a user terminal to infer attributes of a data set or a plurality of recognizers configured to label the data set, the method comprising the steps of: receiving a labeled data set having tallies of each of a plurality of label voting patterns; constructing an inference equation for each of the plurality of label voting patterns in terms of statistical parameters and the tallies, wherein the statistical parameters indicate a probability of an observable event in the labeled data set; calculating values for the statistical parameters based on the inference equation for each of the plurality of label voting patterns; and calculating the attributes of the data set or the plurality of recognizers based on the values of the statistical parameters.

In another embodiment of the present invention, a method is provided for executing a computer program using a processor of a user terminal to estimate a minimum number of recognizers required to infer attributes of a data set or the recognizers configured to label the data set, the method comprising the steps of: receiving a number of labels that can be applied to the data set by the recognizers, wherein the number of labels includes a Null label when applicable; receiving a number of recognizers that are to be correlated in groupings of the recognizers in order to infer the attributes of the data set or the recognizers, wherein the correlation of the groupings of the recognizers relates to a conditional probability of the recognizers in the grouping of recognizers agreeing with each other about the label to apply to a data point of the data set; and determining the minimum number of recognizers based on the number of labels that can be applied to the data set by the recognizers and the number of recognizers that are to be correlated in the grouping of the recognizers.

In another embodiment of the present invention, a method is provided for executing a computer program using a processor of a user terminal to compensate for a probability of unobservable events in a labeled data set, the method comprising the steps of: receiving a labeled data set having at least one instance of each label voting pattern except an all-Null label voting pattern, wherein the labeled data set was labeled by at least four recognizers; constructing a probabilistic representation of the labeled data set; projecting out a portion of the labeled data set associated with one or more of the at least four recognizers from the labeled data set to produce a reduced data set, wherein the reduced data set includes at least one instance of an all-Null label voting pattern of the reduced data set that is observable relative to at least one associated non-Null label voting pattern of the projected out portion of the labeled data set; calculating a probability of the all-Null label voting pattern of the labeled data set based on the at least one instance of the all-Null label voting pattern of the reduced data set; and modifying the probabilistic representation of the labeled data set to compensate for the probability of the all-Null label voting pattern of the labeled data set.

In another embodiment of the present invention, a method is provided for executing a computer program using a processor of a user terminal to compensate for a probability of unobservable events in a labeled data set, the method comprising the steps of: receiving a labeled data set having at least one instance of each label voting pattern except an all-Null label voting pattern, wherein the labeled data set was labeled by at least three recognizers; constructing a probabilistic representation of the labeled data set, wherein the probabilistic representation comprises a plurality of equations; calculating a correction factor by summing the plurality of equations of the probabilistic representation; and constructing a corrected probabilistic representation of the labeled data set based on the probabilistic representation and the correction factor.

In another embodiment of the present invention, a method is provided for executing a program using a processor of a user terminal to infer attributes of a data set or a plurality of recognizers specific to a field or context obtaining sequential statistics for sequential data when performing the labeling task to consider how often labels follow each other from the inferring the prevalence of the correct labels, p(l).

In another embodiment of the present invention, a method is provided for executing a program using a processor of a user terminal to infer attributes of a data set or a plurality of recognizers configured to label the data set for the average accuracy of recognizers outputting a large number of labels. On each labeled data point, the labels outputted by the recognizers are transformed to abstract labels by the following method. The first recognizer is always labeled the same such as, for example, with an abstract label α. The next recognizer is labeled α if it agrees with the first abstract label or with a new abstract label β if it does not. Successive recognizer labels are transformed accordingly to the abstract label of the first recognizer it agrees with it or a new abstract label is introduced. In this manner the large number of labels that some recognizers, such as a in a speech recognition system, produce are reduced to R abstract labels, where R is the number of recognizers used to label the data.

These and other features of the present invention are described with reference to the drawings of preferred embodiments of the method of the present invention. The illustrated embodiments of the method of the present invention are intended to illustrate, but not limit, the invention.

BRIEF DESCRIPTION OF THE DRAWINGS

FIG. 8A-8C show a sample chart of the number of instances of and prevalence parameters for a large DNA data set having three (3) recognizers applied thereto, according to an example of one embodiment of the method of the present invention.

DETAILED DESCRIPTION OF THE PREFERRED EMBODIMENTS

Figure 1:
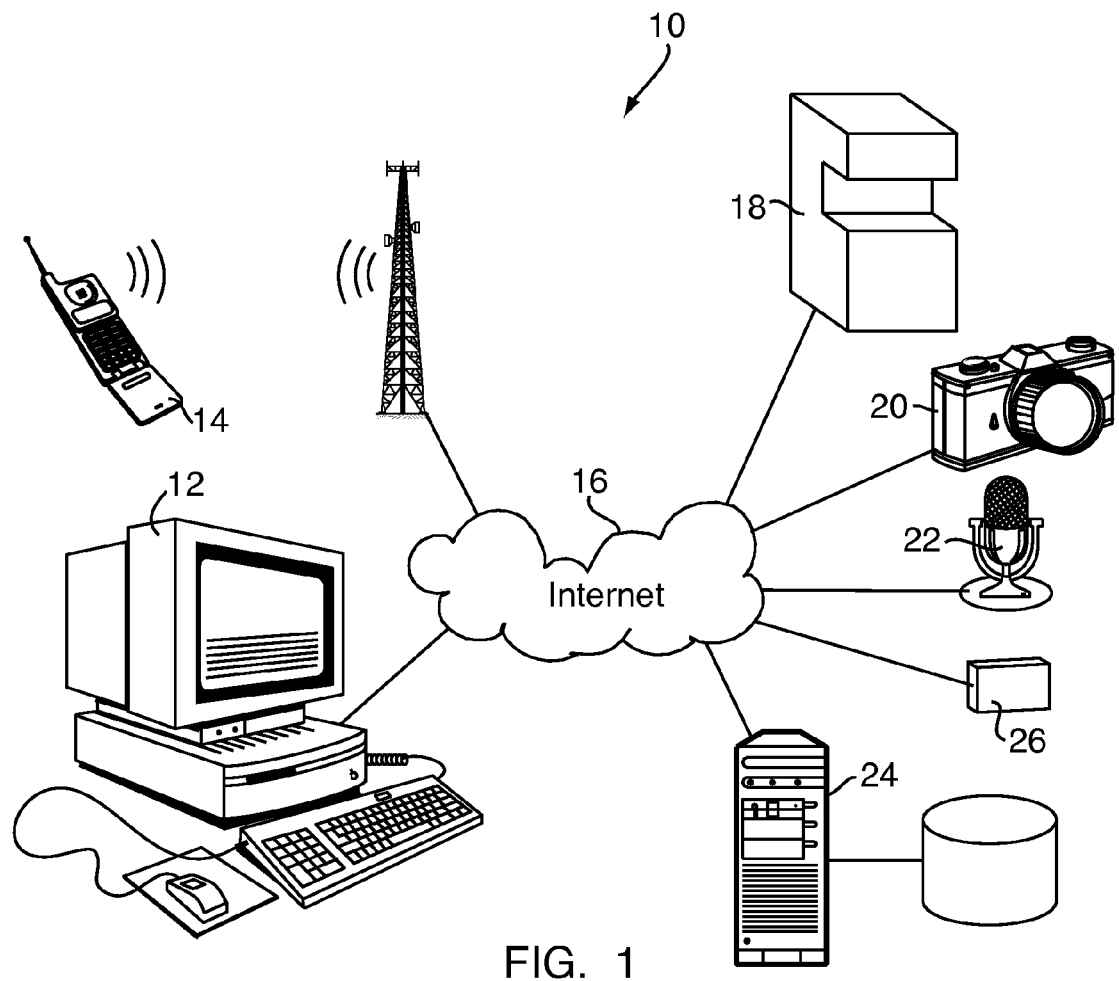
FIG. 1 illustrates a diagram of a system according to the present invention.

Referring to FIG. 1, a networked system 10 is shown. The networked system 10 includes user terminals, such as a computer 12 and a mobile device 14, which include processors and memory, respectively. The user terminals communicate with other devices either directly (not shown) or over a network, such as an Internet 16. The other devices include laboratory test equipment 18 (e.g., a DNA sequencer), video equipment 20 (e.g., a camera), audio equipment 22 (e.g., a microphone), a data archive 24 (e.g., a networked server and database) and any other sensor 26 (e.g., a gyroscopic sensor embedded in the mobile device 14, a keyboard, mouse, touch screen or drive used to receive an input from a human judge).

The memory of the user terminals stores software that is configured to be executed using the processor. The software may, alternatively, be stored in any kind of computer readable medium or as an electronic signal. It should be appreciated that the software can also be stored and executed on a remote network server and that the user terminal can access and invoke the software on the remote network server, such as via a web browser or web portal. Any reference to the method of the present invention being performed on or by the processor of the user terminal encompasses remote processing and cloud computing, or, conversely, the remote network server is merely another embodiment of a user terminal encompassed within the definition thereof.

The software is configured to perform the method of the present invention, as discussed hereafter.

Figure 2:
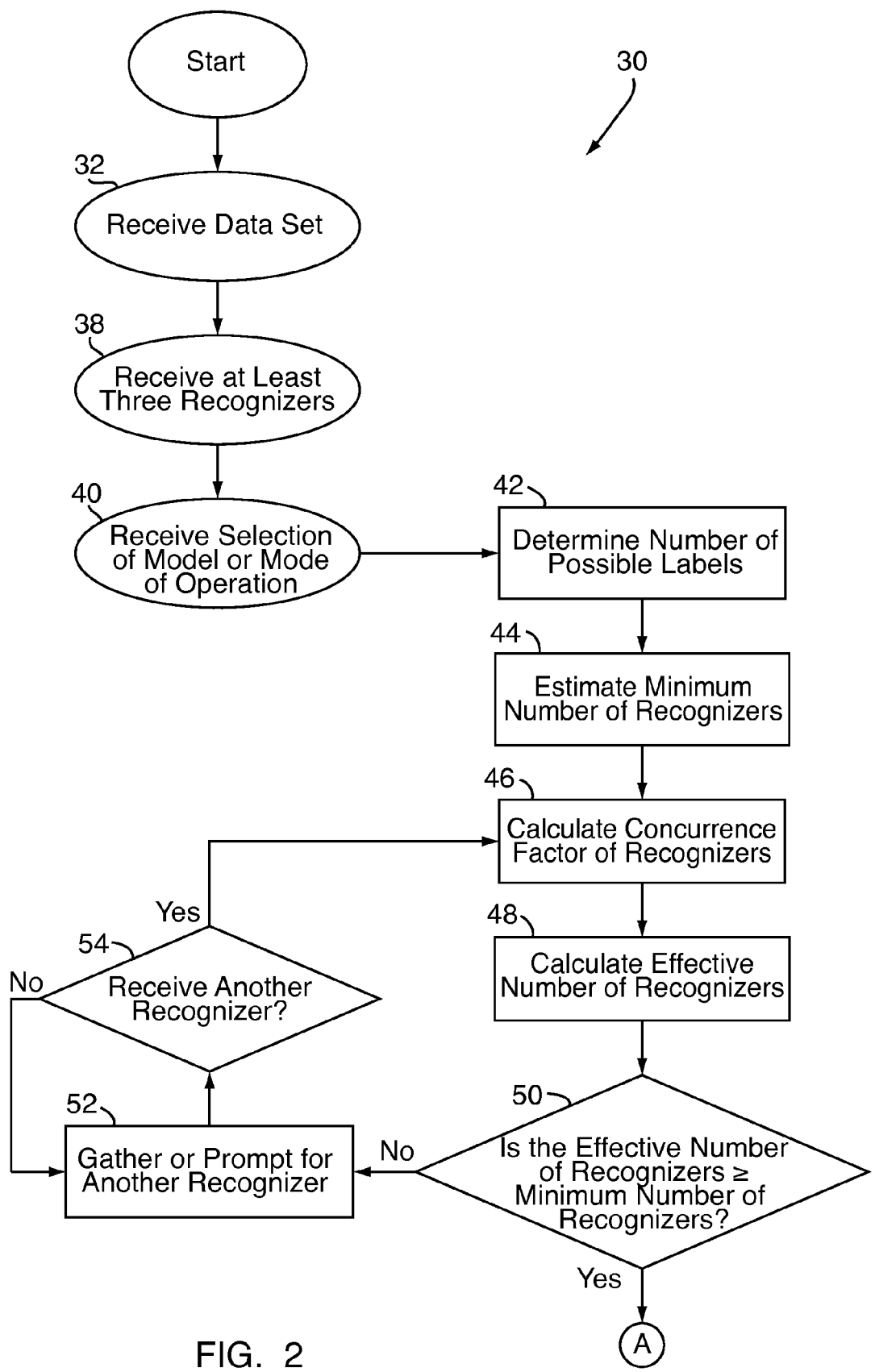
FIG. 2 illustrates a flow chart of a method according to one embodiment of the present invention.

Referring to FIGS. 2-6, a method 30 of the present invention is shown. As shown in FIG. 2, a data set is received (box 32). The data set can include any kind of raw or possibly pre-processed data (e.g., lab results, video or audio footage, sensor or signal data, financial data, etc.). The data set can also include multiple sub-sets of data collected from one or more sensors operated simultaneously at different locations throughout a monitored system. The sub-sets are grouped as needed for labeling.

Figure 7:
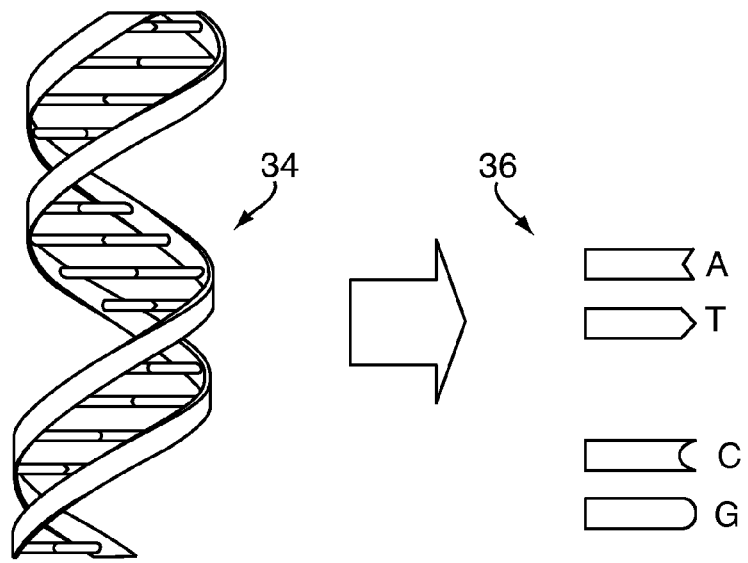
FIG. 7 shows a deoxyribonucleic acid (DNA) double helix and four labels (A, T, C and G) associated with the same, an exemplary context of a data set and a recognizer used in association with one embodiment of the method of the present invention.

For illustrative purposes, the method of the present invention is described in the context of fluorescent dye detection of deoxyribonucleic acid (DNA) sequencer assays. Referring to FIG. 7, a DNA sequence is length of nucleotides 34 that are grouped in pairings of Adenine (A) to Thymine (T), and Cytosine (C) to Guanine (G), as shown at 36. These nucleotides constitute the possible labels that can be applied to the data set by a recognizer, such as a DNA sequencer. The DNA sequence can be understood as a sequential length of these nucleotides. When outputted from the DNA sequencer, the DNA sequence is often stored digitally as a pictographic grid of multi-colored dots of varied size, intensity and placement (i.e., the grid is not perfectly orthogonal). In this raw format, the DNA sequence is unwieldy and predominantly intended for visual review by a human. The raw data must be analyzed and labeled before the underlying DNA sequence can be efficiently utilized for further review.

Referring to FIG. 2, at least three recognizers are received (box 38). The recognizers include modules or human judges that are capable of analyzing, interpreting and labeling the raw data of the data set with labels. Each label represents a peak, trough, pattern or trend of particular significance.

In the exemplary embodiment, the recognizers are fluorescent dye detectors for the raw dyed DNA sequence data. These recognizers apply the A, T, C and G labels to data points of the data set.

A selection of a model and/or mode of operation is received (box 40). The model constitutes an assortment of options to control the operation of the statistical model or approach used by the method of the present invention. For instance, the method includes the option to operate: (a) using n-recognizer correlation factors (i.e., defining a two-recognizer pairing or a three-recognizer grouping, etc.) to measure and account for dependencies between the recognizers; (b) using one of the following approaches to compensate for the effect of unobservable events on the statistical model of the data set and the recognizers, including (i) a projecting out approach, including a selection of which recognizer(s) to project out from the data set, and (ii) a correction factor approach; and (c) using a particular optimization equation to solve the statistical model. In an alternative embodiment of the present invention, step (c) can use an algebraic algorithm to solve the label voting event equations. The algebraic algorithm is advantageous for situations where all the solutions of the equations are wanted rather than a given result of the single solution optimization approach.

The mode of operation constitutes an assortment of options to control the operation of the method of the present invention to a given execution and/or context. For instance, the mode of operation includes the option to operate: (a) to achieve a desired output, such as operating the method (i) for the purpose of identifying which recognizer is most-accurate; (ii) for the purpose of identifying the error rates of each recognizer associated with each label; (iii) for the purpose of determining data set compensation or correction information; or (iv) for a combination of (i), (ii) and (iii); and (b) using a batch-based approach (i.e., batches of 5%, 10%, etc. of the data set at a time, in sequence or at random) with or without a halt condition (e.g., to stop once one of the desired outputs of (b) are obtained with a specified degree of certainty). The mode of operation also includes the option to: (c) configure the output of the method of the present invention.

Additional information concerning the model and mode of operation selections are discussed in greater detail elsewhere in this application.

Preferably, a default model and mode of operation is automatically selected (i.e., a default) unless and until a user input is received to change the selection of the model or mode of operation.

Based on the data set, the recognizers, the model or a user inputted value, a number of possible labels is determined (box 42). Preferably, the number of possible labels is automatically determined by reviewing the content of the data set, the possible outputs of the recognizers and information associated with the selected model. However, a user may input the number of possible labels.

For example, in the exemplary context, it is a well-known scientific fact that DNA is expressed using only four (4) nucleotides (e.g., A, T, C and G), therefore, the user can readily input four (4) as the number of possible labels with a high degree of confidence.

The inputted number of possible labels does not include the Null label, which is an inherent additional label that must be taken into account in all applications of the method of the present invention that involve sequential data that can have deletion and insertion errors.

A minimum number of recognizers is calculated (box 44). At an absolute minimum, there must be at least three (3) recognizers to perform the method of the present invention. If there are two (2) or fewer recognizers, there is an insufficient frame of reference to determine which of the recognizers is the most accurate or to draw any meaningful conclusions about the character and attributes of the data set therefrom.

To compute the minimum number of recognizers that are required, the following analysis is conducted. As a given, it is assumed that there are $l$ labels and $r$ recognizers that are each independent of each other. The number of possible voting patterns that could be observed in order to make an inference about the frequency of each possible label voting pattern is $l^r$. Since the frequency of the label voting patterns must sum to one (1), there can be at most $l^r-1$ independent equations.

In the case of completely independent recognizers, the number of statistical variables that need to be inferred is calculated by adding the number of prevalence values that are present (possibly including a Null label) minus one, $l-1$, with the number of conditional probabilities for each recognizer given a label, $r*l*(l-1)$, for a total of $(l-1)+r*l*(l-1)$ or $(1+r*l)*(l-1)$.

Setting these two equations equal to each other, as shown below, allows the minimum number of recognizers, r_min, to be solved as follows:

Equation 1: The Minimum Number of Recognizers, r_min, in Terms of the Number of Labels, l:

$$l^{r\_min}-1 \geq (1+r\_min*l)*(l-1).$$

By solving for r_min in Equation 1, above, it is known that the value of r_min must be equal to or greater than three (3) for any number of labels (i.e., given that l must be greater than or equal to two (2), since a binary labeling scheme is the most minimally informative labeling scheme possible).

However, in some contexts, more than three (3) recognizers may be required, for instance, if the recognizers are partially or fully interdependent and based on the number of labels applied to the data set, including the Null label in the case of recognizers producing deletion and insertion errors when processing sequential data, and the selected model. In these contexts, the recognizers would not produce uncorrelated labeling decisions.

For example, in the context of document relevance detection, there is two-label recognition (i.e., relevant or not-relevant) and, thus, one independent prevalence parameter. In this context, the data set is sequential but only subject to substitution errors (i.e., each document is readily observable and the only possible error is whether the recognizer correctly determined the relevance of that document). Assuming the selection of a two-recognizer correlation factor and that there must be as many pair correlation parameters as there are pairs of recognizers, the number of parameters needed to model the conditional probability of recognizing the labels is as follows:

total number of parameters needed to model conditional probability in the context of document relevance detection: $\qquad$ Equation 2

$$(l-1)+l*\left(l*r+\frac{r*(r-1)}{2}\right),$$

$$((2)-1)+(2)\left((2)*r+\frac{r*(r-1)}{2}\right),$$

$$1+3*r+r^2.$$

Since the total number of observable events must be greater than the total number of parameters needed to model the conditional probabilities, the minimum number of recognizers can be estimated by comparing Equation 1 to Equation 2 for a given number recognizers, as shown in the following table.

TABLE 1

| | minimum number of recognizers, r_min | |
|---|---|---|
| Number of Recognizers | Number of Independent Voting Pattern Frequency | Number of Model Parameters |
| R | $l^r - 1$ | $1 + 1*\left(l*r + \dfrac{r*(r-1)}{2}\right)$ |
| 3 | 7 | 19 |
| 4 | 15 | 29 |
| 5 | 31 | 41 |
| 6 | 63 | 55 |
| 7 | 127 | 71 |

Table 1 shows that the minimum number of recognizers required to solve for the statistical parameters of the document relevance detection model is six (6). For five or fewer recognizers, there is an insufficient number of observable events to solve for each of the parameters.

It should be appreciated that the number of available recognizers will be significantly greater than three (3) in most contexts. For instance, there may be ten or more recognizers (r≥10) commercially available in a given field or for a given application. However, due to expense, restricted distribution or other factors, it may be impractical or prohibitive to gain access to all of the known recognizers. Accordingly, a selection of an additional recognizer may need to be made.

To facilitate the selection of an additional recognizer, a concurrence factor of the recognizers is estimated (box 46). Preferably, the concurrence factor is determined by operating the previously received recognizers on the data set, or, preferably, randomly selected portions of the data set, and comparing the labels applied by the recognizer to each other in pairs. The concurrence factor between the recognizers is determined by calculating a percentage of the sampled data set over which the recognizers agree versus disagree. It should be appreciated that the concurrence factor of recognizers may be well known in the art and can, alternatively, be gathered via a look-up to an available resource, such as a web-hosted database containing the correlation information.

An effective number of recognizers is calculated (box 48). Preferably, a summation or root mean square based on the concurrence factor of the previously received recognizers to each other is calculated to determine the effective number of recognizers.

It is determined if the effective number of recognizers is greater than the minimum number of recognizers required to draw an inference about the data set and the recognizers (box 50). If the effective number of recognizers is less than the minimum number of recognizers required, another recognizer is gathered or a prompt is issued for the same (box 52).

If the degree of concurrence of various recognizers is known, the method of the present invention can gather or prompt the user for additional recognizers based on the degree of concurrence (i.e., starting with the least frequently agreeing recognizers and ending with the most often agreeing recognizers). The method of the present invention can also gather or prompt the user for additional recognizers based on resource limiting factors, such as expense or a ratio of the degree of concurrence to expense.

If another recognizer is received (box 54), then the concurrence between the received recognizers is estimated again (box 46).

Otherwise, another recognizer is gathered or prompted again (box 52).

Figure 3:
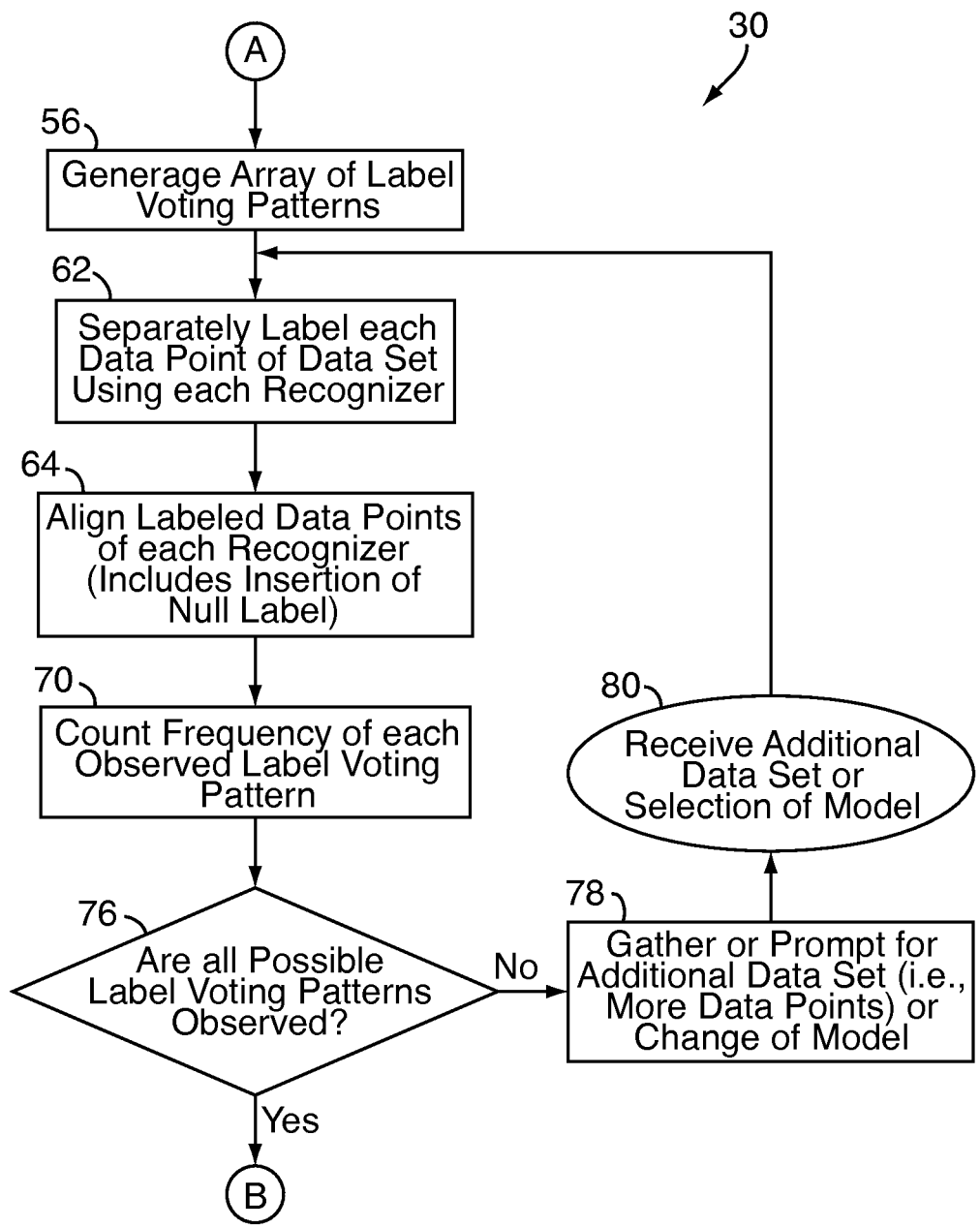
FIG. 3 illustrates a continuation of the flow chart of the method according to FIG. 2.

Referring to FIG. 3, if there are more recognizers than is required, an array of label voting patterns is generated (box 56). The array of label voting patterns constitutes all possible combinations of labels that could be applied to the data set by the recognizers.

Referring to FIGS. 8A-8C, a sample chart of the results of performing three (3) recognizers on a large data set of DNA data is shown at 58. The chart 58 includes a listing of all possible label voting patterns or events 60. Since there are four (4) labels (e.g., A, T, G, C) plus one (1) Null label (i.e., since DNA sequencers typically produce insertion and deletion errors) for five (5) total label possibilities, l, and there are three (3) recognizers, r, there are $l^r$ or $5^3 = 125$ possible label voting patterns.

Referring to FIG. 3, all data points of the data set are labeled using each recognizer (box 62). In particular, the recognizers are separately performed on the data set. The output of the recognizers is a number of sequences of labeled data points that correspond to the data set.

It should be appreciated that each recognizer is assumed to be at least 1/l accurate in most applications. This is because, for most applications, practical recognizers are usually better than 1/l in accuracy to warrant their usefulness in a labeling task.

In the case of sequential data sets, the sequences of labeled data points of the data set are aligned (box 64). The data points are aligned in accordance with known string alignment techniques. The alignment of data points includes the insertion of a Null label, where needed, to make the data points align. The insertion of Null labels has the effect of expanding the total length of the data set to account for errors of each recognizer. This may effectively expand the total length of the data set beyond its true length.

Figure 9:
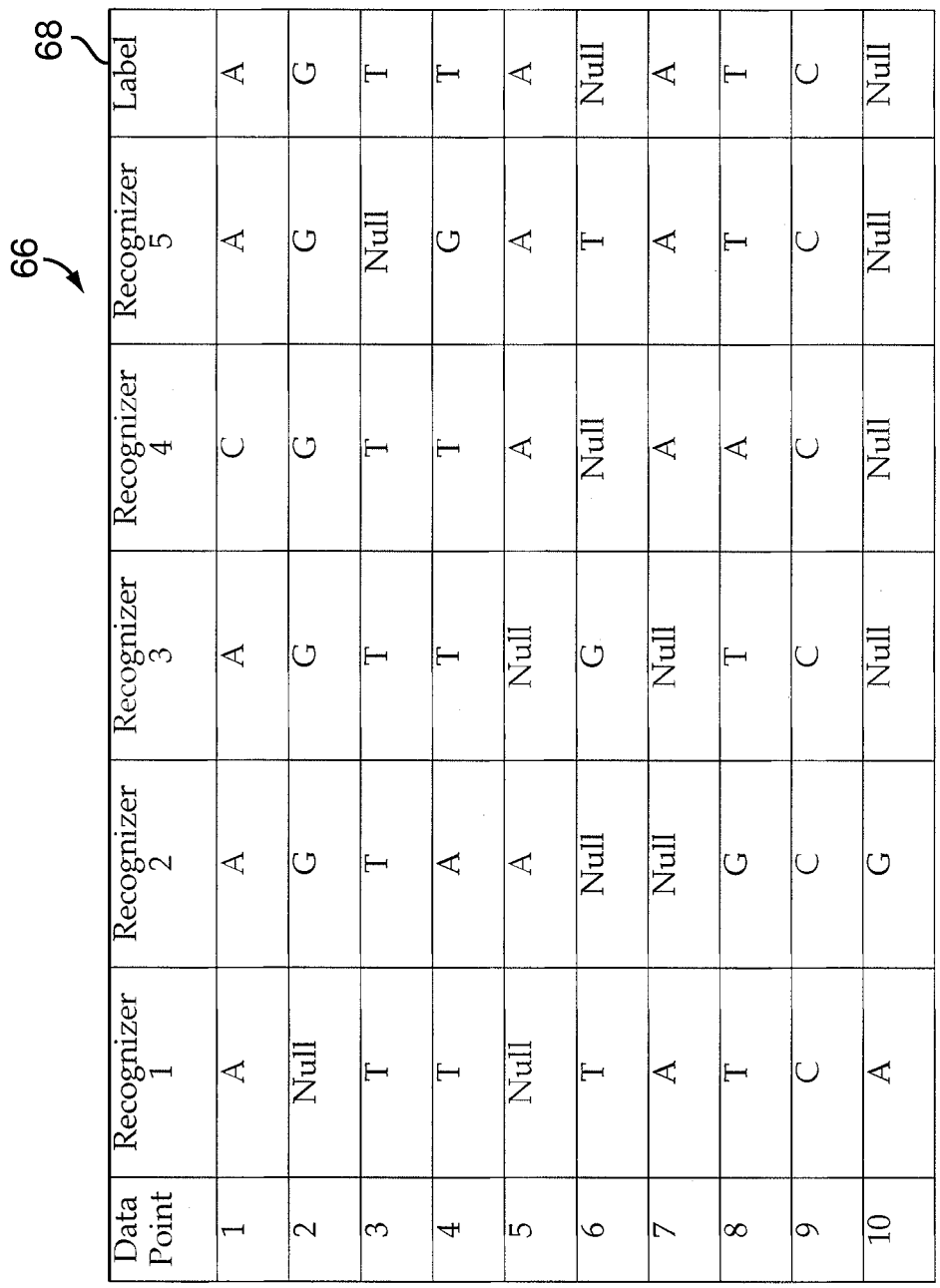
FIG. 9 shows a sample chart of ten (10) DNA-data points that have had five (5) recognizers applied thereto and a correct label that can be inferred by the recognizers, according to an example of one embodiment of the method of the present invention.

Referring to FIG. 9, a sample chart of the output of five (5) recognizers applied to a data set of DNA data that has been aligned as five sequences of ten (10) data points is shown at 66. The chart 66 includes an unknown "correct" label 68 (i.e., a best-guess of the correct label since the true correct label cannot really be known) for illustrative purposes, since the method of the present invention works without any knowledge of the true correct label. It should be appreciated that each label voting pattern is possible, although only a limited selection is shown in the chart 66.

The frequency of each observed label voting pattern is counted (box 70). Counting the frequency of each label voting pattern means that each instance of the label voting pattern is tallied.

Referring to FIGS. 8A-8C, the chart 58 includes a count or tally 72 of the observed instances of each label voting pattern. As would be expected, the label voting patterns where each recognizer agrees and produces the same label (e.g., {A,A,A}, {C,C,C}, {T,T,T}, {G,G,G}) are the most frequent. In contrast, the label voting patterns where each recognizer disagrees and produces a different label (e.g., {A,C,T}) are the least frequent.

A label voting pattern of all-Nulls 74 (e.g., {Null-Null-Null}) is an anomaly in that this event is unobservable. Specifically, the absence of a label from all recognizers would not be observable and any such "void" portions of the data set would be overlooked. Where there is no data point in actuality and, thus, the all-Nulls instance is correct, there is no problem and the method should rightly overlook the non-event. However, the respective frequency of the all-Nulls label voting pattern is important because it is possible that there actually was a data point, but all of the recognizers failed to detect and label the data point, the alignment of the outputs of the recognizers improperly merged multiple data points into fewer data points (i.e., constructively deleting a data point) or the like. Failing to correct for the probability of the incorrect all-Nulls instance negatively affects the relative probability of all other label voting patterns.

Omitting instances of the all-Nulls label voting pattern decreases the effective length of the data set. This may effectively reduce the total length of the data set below its true length.

Referring to FIG. 3, once the label voting patterns are counted, the label voting patterns are checked to determine if all possible label voting patterns are observed in the data set (box 76). If not, additional data sets are automatically gathered, if available (i.e., during operation according to the batch processing model), or the user is prompted to supply additional data sets or change the selected model (box 78). Once the additional data sets or a selection of a different model is received (box 80), the data set is separately labeled by each recognizer, again, as needed (box 62).

It should be appreciated that if an additional data set is provided only the new data set needs to be labeled, aligned, merged into the labeled data set and counted, the resultant tallies of which can be added to the prior tallies.

Figure 4:
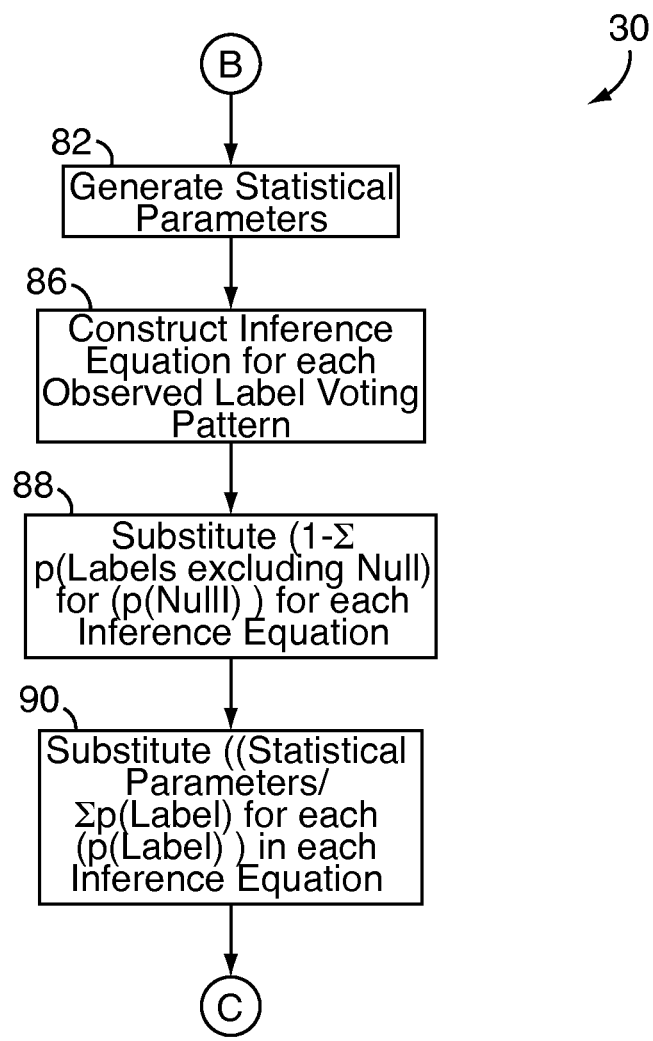
FIG. 4 illustrates a continuation of the flow chart of the method according to FIG. 3.

Referring to FIG. 4, if all needed label voting patterns are observed (i.e., at least one instance of each label voting pattern), statistical parameters for the selected model are generated (box 82). The statistical parameters include prevalence parameters, which are variables that model the frequency of the correct labels in the data set, and recognition parameters, which are variables that model the conditional probability that the recognizers would output a label voting pattern given a correct label for a data point. Within the processor, the conditional probabilities of recognition are represented as polynomial fractions of the recognition parameters.

In the context of the DNA embodiment, the prevalence parameters directly model the frequency of each label in the data set. Each conditional recognition probability variable, which is the probability of a given label voting pattern given a correct label, is expressed as a polynomial fraction. The polynomial fraction includes a monomial factor (i.e., a numerator) divided by the sum of all monomial factors for all of the possible label voting patterns given the correct label (i.e., a denominator, commonly called a partition function).

In the context of the DNA embodiment, the recognition parameters include an aggregation of group correlation variables. Each group correlation variable, which is the probability of two or more recognizers agreeing with each other that a given label is to be applied to a data point of the data set, is expressed as a single algebraic variable. If more than one group correlation variable applies, the group correlation variables are multiplied together.

Referring to FIGS. 8A-8C, the chart 58 lists a numerator 84 for each label voting pattern. The numerator 84 includes the multiplication of the statistical parameters for the label voting pattern where the selected model utilizes pair (i.e., 2-recognizer) correlation factors. The conditional recognition probabilities of the model are symbolized as follows. For label voting pattern number 1, {A,A,A}, when the true or correct label is actually "G" (i.e., as signified by the second letter of each statistical model parameter), the conditional label voting event probability contains the multiplication of conditional recognition probability variables: xGA1 (a parameter to model the preponderance that the first recognizer applies the label "A" when presented with a data point whose true label is "G"), xGA2 (a parameter to model the preponderance that the second recognizer produces the label "A" when presented with a data point whose true label is "G"), and xGA3 (a parameter to model the preponderance that the third recognizer produces the label "A" when presented with a data point whose true label is "G"), which results in the term xGA1*xGA2*xGA3.

The recognition parameters of the model also contain factors that model the pair correlation of the recognizers as follows. For label voting pattern number 1, {A,A,A}, when the true or correct label is actually "G" (i.e., as signified by the second letter of each conditional parameter), the conditional parameter is the multiplication of the grouping correlation variables: yG12 (a parameter to model the preponderance that recognizers 1 and 2 are positively or negatively correlated when producing a label when presented with a data point with the true label "G"), yG13 (a parameter to model the preponderance that recognizers 1 and 3 are positively or negatively correlated when producing a label when presented with a data point with the true label "G") and yG23 (a parameter to model the preponderance that recognizers 2 and 3 are positively or negatively correlated when producing a label when presented with a data point with the true label "G"). These pair correlation parameters result in the term yG12*yG13*yG23.

Finally, the conditional recognition probability p({A,A,A}|G) is computed as xGA1*xGA2*xGA3*yG12*yG13*yG23/Partition function.

An inference equation, which is a probabilistic representation of the data set, is constructed for each observed label voting pattern (box 86).

In the context of the DNA embodiment, 124-inference equations are constructed, one for each observed label voting pattern, plus a 125th equation for the all-Null (e.g., {Null,Null,Null}) label voting pattern because the recognizers are capable of producing deletion and insertion errors.

The inference equation for each label voting pattern is as follows:
Equation 3: Inference Equation:

$$f(\{\text{label voting pattern}\}) = \Sigma p(\text{label}) p(\{\text{label voting pattern}\}|\text{label}).$$

For example, the inference equation for label voting pattern number 49 (i.e., {C,Null,T}) in the DNA embodiment, as shown in FIGS. 8A-8C, is as follows:
Equation 4: Inference Equation for {C,Null,T} Label Voting Pattern:

$$f(\{C,\text{Null},T\}) = p(A)*p(\{C,\text{Null},T\}|A) + p(C)*p(\{C,\text{Null},T\}|C) + p(G)*p(\{C,\text{Null},T\}|G) + p(T)*p(\{C,\text{Null},T\}|T) + p(\text{Null})*p(\{C,\text{Null},T\}|\text{Null})$$

Each inference equation sets an observable event (e.g., the frequency of label voting pattern {C,N,T}) equal to unknown statistics that are desired to infer knowledge about the data set and the performance of the recognizers.

The second expression of each multiplication on the right hand side of Equation 2 (i.e., p({label voting pattern}|label) or, e.g., p({C,Null,T}|G)) are referred to as conditional probabilities of producing a label voting pattern given a true label. The conditional probabilities will have different formulations depending on the model used to further express the inference equations. For example, in the embodiment used here, the p({C,Null,T}|G) statistical quantity is equal to xGC1*xGN2*xGT3/(partition function: the sum of all monomial factors over all possible labeling voting pattern).

In the case that a Null label has been introduced to measure deletion and insertion errors, the expression (1−Σp (label excluding Null)) is substituted for instances of (p(Null)) in the inference equation (box 88). These expressions are equal to each other because (Σp(label)) must be equal to one (1), according to the following identity:

probability identity: Equation 5

$$\sum_{l=1}^{l\_max} p(l) = 1$$

$$p(A) + p(C) + p(G) + p(T) + p(\text{Null}) = 1,$$

$$p(\text{Null}) = 1 - (p(A) + p(C) + p(G) + p(T)).$$

The statistical parameters are substituted for each (p(label)) in the inference equation (box 90). This substitution rewrites the inference equations in terms of the statistical parameters.

As discussed above, instances of all-Null label voting patterns cannot be observed when all available recognizers are used. However, the frequency or probability of all-Null label voting pattern, and, in particular, the incorrect instance of the all-Null label voting pattern, impacts the relative probability of the other label voting patterns.

If the data set is sequential or includes the Null label, the effect of the all-Null label voting pattern can be compensated for as follows.

Figure 5:
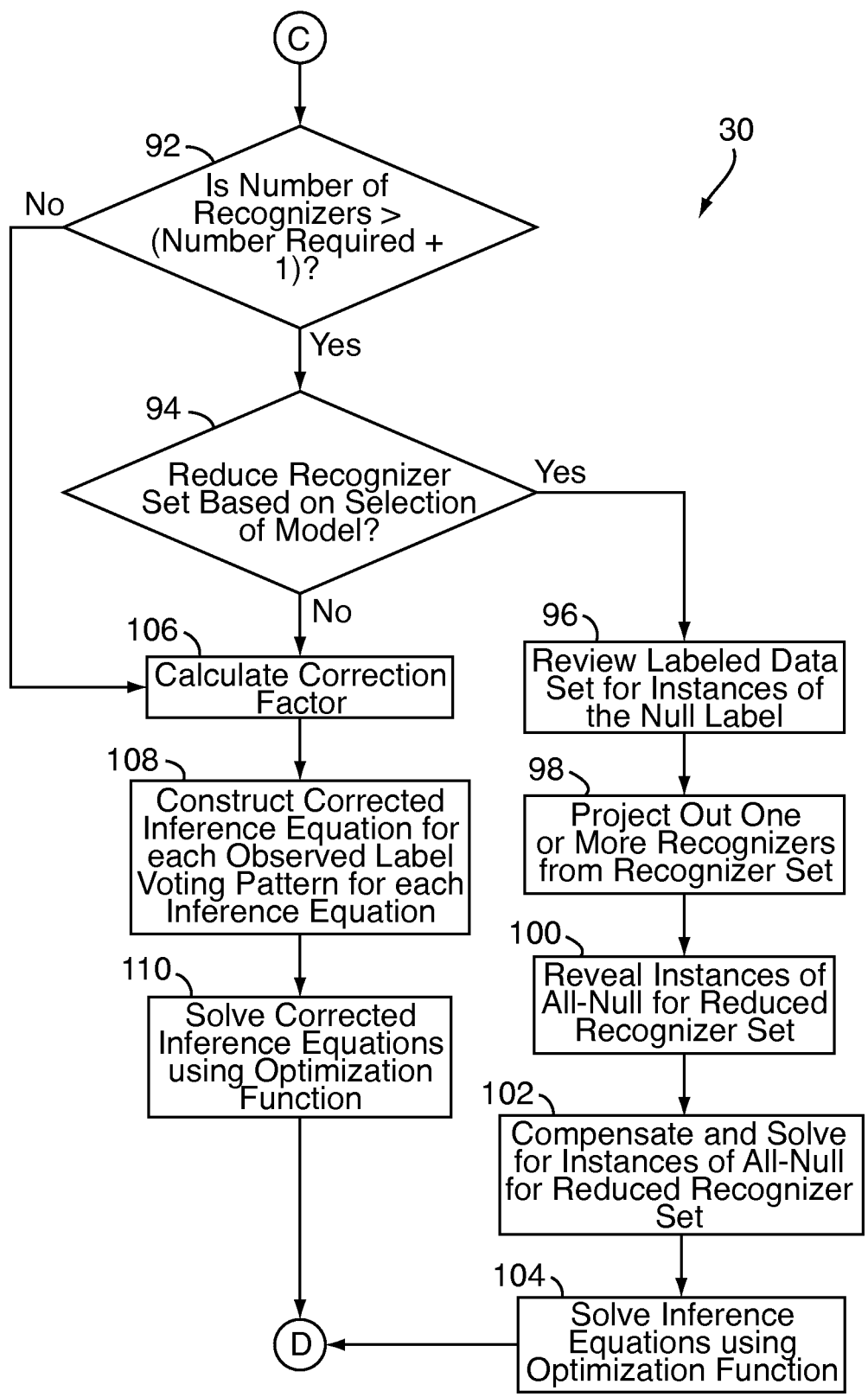
FIG. 5 illustrates a continuation of the flow chart of the method according to FIG. 4.

Referring to FIG. 5, it is determined whether the number of recognizers exceeds the minimum number of recognizers required plus one (1) (box 92). If so, it is determined whether the number of recognizers should be reduced based on the model that was selected (box 94). If so, the labeled data set is reviewed for instances of the Null label for each recognizer (box 96). The Null label is tallied to find a total number of instances that it is observed for each recognizer and analyzed based on its correlation with instances of the Null label of the other recognizers.

Then, one or more of the recognizers is projected out from the recognizer set (box 98). The projection of one or more of the recognizers from the recognizer set leaves a reduced set of recognizers that form the basis of the labeled data set that is to be analyzed, defining a reduced data set.

Preferably, the projection of the one or more of the recognizers is performed based on the review of the Null label in the labeled data set for each recognizer. However, the one or more of the recognizers can be removed at random or based on a systematic selection process. The systematic selection process includes projecting out the one or more of the recognizers based on their relative order in the set of recognizers (i.e., projecting out the first or last n-recognizers) or another automated selection process. The systematic selection process also includes iterating the projection out of one or more of the recognizers for multiple, and, preferably, every, available combination, completing the all-Nulls compensation means process and, then, reconciling the result of each iteration.

The labeled data set of the one or more projected out recognizers reveals all-Null instances for the reduced recognizer set (box 100). Since an all-Null instance for all of the recognizers cannot be observed, as discussed above, at least one of the one or more removed recognizers will include a non-Null label that can be projected down.

Referring now to FIG. 9, if recognizers 1 and 2 were removed, leaving a reduced data set of recognizers 3, 4 and 5, the tenth data point represents how the non-Null labels of recognizers 1 and 2 can be projected down onto an all-Null instance of the labeled data set of the remaining recognizers 3, 4 and 5.

Referring again to FIG. 5, instances of all-Null for the reduced recognizer set are compensated for and solved (box 102). The frequency of the all-Null instances of the reduced data set (i.e., p({Null,Null,Null})) is approximated by tallying the frequency of the projected down set of removed recognizers out of all data points of the data set. Then, the frequency of the all-Null instances of the reduced data set is carried over to the labeled data set, where it is used to solve the inference equations.

Inference equations for the labeled data set are solved using an optimization function (box 104). The prevalence parameters and the conditional parameters in the inference equations are solved by constructing an optimization function and, then, minimizing the optimization function using standard optimization algorithms, such as the Nelder-Mead algorithm.

The optimization problem can be represented as a minimization problem, as follows:

minimize equation: Equation 6

$$\sum_{label\_voting\_pattern=1}^{l^r} (f(\{label\_voting\_pattern\}) - InterferenceEquation(\{label\_voting\_pattern\}))^2.$$

Minimizing the positive optimization function reduces the least squares error of the fit. The optimization equation is subject to the constraint that all the statistical parameters are positive. If the optimization process was perfect, the minimum value would be zero.

Otherwise, if the number of recognizers is not greater than the minimum number of recognizers plus one (1) or if the selected model does not indicate that one or more of the recognizers should be projected out, a correction factor is calculated (box 106). The correction factor, $c_f$, is equal to one (1) minus the mathematically expected frequency of the all-Null events. Although instances of the all-Null label voting pattern cannot be observed, as discussed above, it can be expressed mathematically.

For example, referring again to FIGS. 8A-8C, the correction factor for a DNA data set labeled by three recognizers is as follows:

Equation 7: Correction Factor:

$$c_f = 1 - p(A)*p(\{\text{Null,Null,Null}\}|A) - p(C)*p(\{\text{Null,Null,Null}\}|C) - p(G)*p(\{\text{Null,Null,Null}\}|G) - p(T)*p(\{\text{Null,Null,Null}\}|T).$$

The correction factor, $c_f$, is also equal to the summation of the expected frequency of the observable label voting patterns, also expressible as the sum of the inference equations for observable label voting patterns. When the all-Null event is not observable, the correction factor, $c_f$, allows the observable frequency of all label voting patterns, f({label voting pattern})=((number of instances of the label voting pattern)/(total number of observable voting patterns)), to be reduced to the frequency that would be measured, f({label voting pattern}), if the all-Null event was observable as follows:

Equation 8: Correction Factor:

$$c_f(\{label\_voting\_pattern\})/f(\{label\_voting\_pattern\}).$$

For example, for instances of the {C,Null,T} label voting pattern shown in FIGS. 8A-8C, the correction factor, $c_f$, is as follows.

Equation 9: Correction Factor for the {C,Null,T} Label Voting Pattern:

$$c_f \ast f(\{C,\text{Null},T\}) = f(\{C,\text{Null},T\}).$$

A corrected inference equation is constructed for each observed label voting pattern (box 108). The corrected inference equation is constructed by multiplying the observed frequency of each label voting pattern by the correction factor, $c_f$.

For example, for instances of the {C,Null,T} label voting pattern shown in FIGS. 8A-8C, the corrected inference equation is as follows:

Equation 10: Corrected Inference Equation for {C,Null,T} Label Voting Pattern:

$$c_f \ast f(\{C,\text{Null},T\}) - (p(A)\ast p(\{C,\text{Null},T\}|A) + p(C)\ast p(\{C,\text{Null},T\}|C) + p(G)\ast p(\{C,\text{Null},T\}|G) + p(T)\ast p(\{C,\text{Null},T\}|T) + p(\text{Null})\ast p(\{C,\text{Null},T\}|\text{Null})) = 0.$$

The corrected inference equations are solved using an optimization function (box 110). The optimization function is applied to the corrected inference equation according to the technique used in conjunction with the projecting out approach, as discussed above. Solving the corrected inference equations allows one to recover all relevant model parameters needed to calculate the same statistical quantities as in the case where the all-Null label event is observable.

Figure 6:
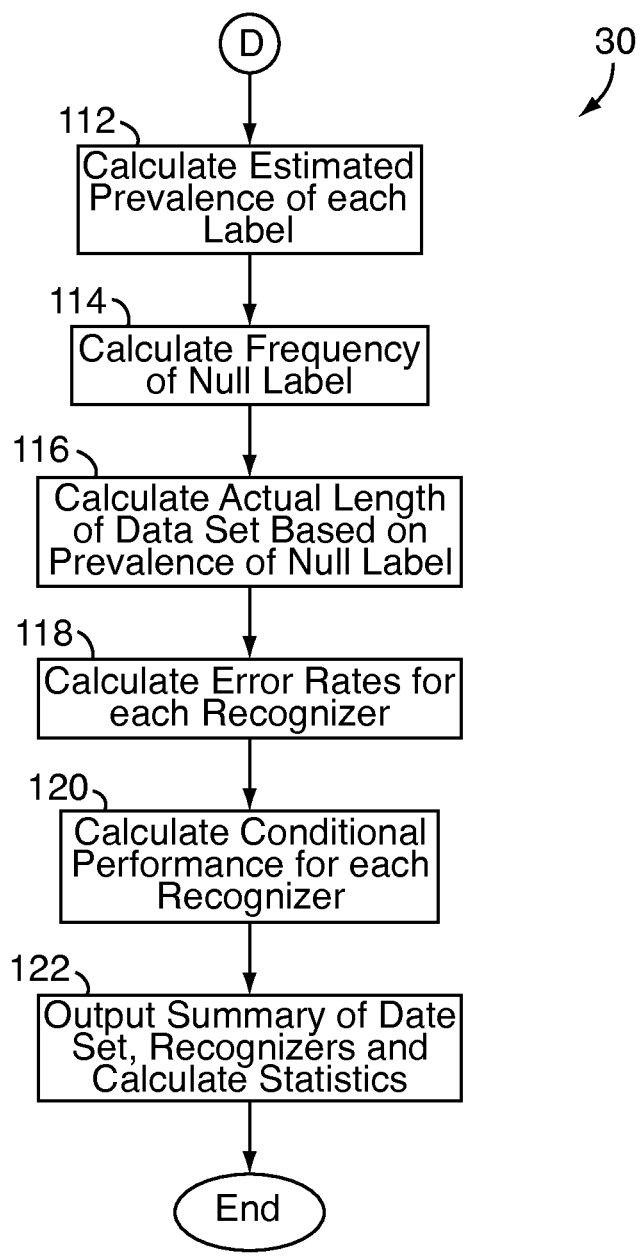
FIG. 6 illustrates a continuation of the flow chart of the method according to FIG. 4.

Referring to FIG. 6, an estimate of the prevalence of each label is calculated (box 112). The estimate of the prevalence of each label, which is calculated based on the solved inference equations and/or corrected inference equations, represents a better estimate of the prevalence of each label than was determined by simply calculating an average prevalence of each label for each recognizer or for all recognizers, combined, using known techniques.

The frequency of the incorrect all-Nulls label voting pattern is also calculated (box 114). The prevalence of the incorrect all-Nulls label voting pattern is calculated, in part, using an inference equation for the unobservable events (i.e., the all-Nulls label voting pattern) to calculate a quantitative approximation of the prevalence of the unobservable events.

In the case of a sequential data set, the true length of the data set is calculated based on the inferred prevalence of the incorrect all-Nulls label voting pattern (box 116). Specifically, the prevalence of the incorrect all-Nulls label voting pattern is added to the length of the data set, correcting for the improper deletion of label data points, alignment of outputs of the recognizers or other issue.

In the case of recognizers that produce deletion and insertion errors while labeling sequential data, the error rates for each recognizer are calculated (box 118). The error rates include a substitution error rate, a deletion error rate and an insertion error rate, which are calculated according to the following equations:

Equations 11-13 error rates for recognizers:

$$error_{substitution}(r) = \frac{\sum_{\ell \in \{A,C,G,T\}} p(\ell)\left(\sum_{e[r] \neq \ell \cap N} p(e|\ell)\right)}{\sum_{\ell \in \{A,C,G,T\}} p(\ell)}$$

$$error_{deletion}(r) = \frac{\sum_{\ell \in \{A,C,G,T\}} p(\ell)\left(\sum_{e[r] = N} p(e|\ell)\right)}{\sum_{\ell \in \{A,C,G,T\}} p(\ell)}$$

$$error_{insertion}(r) = \frac{p(N)\left(\sum_{e[r] \neq N} p(e|N)\right)}{\sum_{\ell \in \{A,C,G,T\}} p(\ell)}.$$

The expression e[r] refers to the label assigned to recognizer, r, to the label voting pattern event, e. The error rates calculated with the parameter values that solved the inference equations optimization problem are the inferred error rate of each recognizer. For purposes of illustration, we compare the inferred error rates from fitting a pair correlation model to the tallies in FIGS. 8A-8C, 9 to the actual values for this data set for which the correct label was available In the practical application of this invention, the actual values are unknown and we have only the inferred values for the error rates.

Referring to FIGS. 8A-8C, for label voting pattern 49 (i.e., {C,N,T}), e[1]=C, e[2]=N and e[3]=T, and the three recognizers might have error rates as follows (expressed as a percentage):

TABLE 2 substitution error rates for each recognizer:

|  | Recognizer 1 | Recognizer 2 | Recognizer 3 |
|---|---|---|---|
| Actual error rate | 10.1 | 10.5 | 10.2 |
| Inferred error rate | 9.6 | 10.2 | 11.0 |

TABLE 3 deletion error rates for each recognizer:

|  | Recognizer 1 | Recognizer 2 | Recognizer 3 |
|---|---|---|---|
| Actual error rate | 3.4 | 3.5 | 3.4 |
| Inferred error rate | 3.2 | 3.3 | 3.6 |

TABLE 4 insertion error rates for each recognizer:

|  | Recognizer 1 | Recognizer 2 | Recognizer 3 |
|---|---|---|---|
| Actual error rate | 3.7 | 3.2 | 3.3 |
| Inferred error rate | 3.7 | 3.2 | 3.6 |

Referring again to FIG. 6, the conditional performance attribute for each recognizer is computed (box 120). The conditional performance attributes for the recognizers indicate relevant information about the recognizers, such as which of the recognizers was the most accurate at labeling the data set. The conditional performance attributes also indicate the accuracy of the recognizer at applying specific labels both alone and in combination with the other recognizers (i.e., represented using the conditional parameters).

A summary of the data set attributes and other computed statistics is generated and outputted (box 122). The output includes the various figures and variables that were observed and computed during the course of the method, such as the length of the data set, the prevalence of each label in the data set, the certainty of each label being applied to a data point in the data set, the error rates of each of the recognizers and the conditional performance attributes of each of the recognizers. The output also includes information that identifies the data set, the recognizers utilized, the selected model, mode of operation and other attributes of the operation of the method of the present invention.

It should be understood that the foregoing description is only illustrative of the invention. Various alternatives and modifications can be devised by those skilled in the art without departing from the broader aspects of the present invention.

In an alternative embodiment of the present invention, the method and system of the present invention are applied to recognizers specific to a field or context other than DNA sequencing. For example, the method and system of the present invention are compatible with the following non-exhaustive and non-exclusive list of recognizers and their corresponding context: fingerprint detection and identification software, voice recognition and identification software, speech recognition software, facial recognition and identification software, optical character recognition software, part of speech tagging in natural language processing software, document relevance detection in an information retrieval setting and quantitative analysis software for investing, finance and the like.

Inferring how often labels follow each other can be accomplished by an alternative embodiment of the present invention, whereby the method and system of the present invention are applied to recognizers specific to a field or context obtaining sequential statistics for sequential data when performing the labeling task to consider how often labels follow each other from the inferring the prevalence of the correct labels, p(l). In sequential data, such as a DNA snippet, we may be interested in understanding more about the sequence itself, not just a count of how often the base pairs appear. An aspect of the present invention addresses the process of inferring how often labels follow each other. That corresponds to being able to estimate the quantities $p(l^{(i)}, l^{(i-b)})$. In general, the number of steps back, b can be any number that you choose. In many cases, b=1 is sufficient.

Figure 10:
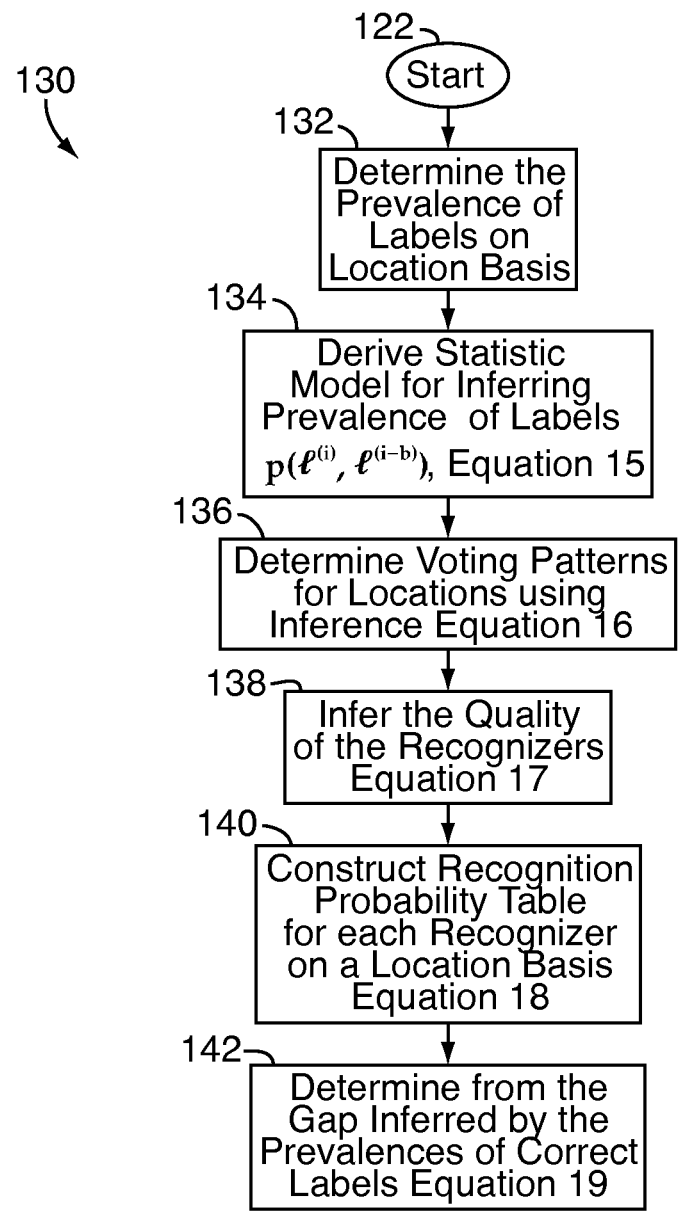
FIG. 10 illustrates a flow chart of an example of one embodiment of the method of the present invention for inferring how often labels follow each other.

The frequencies of observable events can be determined as illustrated in FIG. 10. As in inferring the prevalence of correct labels p(l), and this embodiment is illustrated with the label voting patterns at a single location. The number of patterns is $L^R$ and we are determining the label voting patterns that occur when evaluating two different locations. The number of sequential label voting patterns can be represented by $L^R L^R = L^{2R}$.

For example, when carrying out a two-label task with three recognizers the number of observable events is equal to $2^3=8$. Table 5 below shows the number of possible patterns in this case:

TABLE 5

Possible label voting patterns at a single location for the two-label task carried out by three recognizers,

A, A, A
A, A, B
A, B, A
B, A, A
A, B, B
B, A, B
B, B, A
B, B, B

According to a process of the present invention 130, if the sequential statistics are to be obtained, the process tallies frequencies of events at different locations. Accordingly to illustrate this embodiment by way of a non-limiting example, the locations are restricted to two locations (box 132) arbitrarily separated by an amount determined by the user. Input can be from the previous determinations of the process "D" or a new data set is presented. It should be appreciated that the invention can be applied to tallies of frequencies at three or more locations.

In deriving the statistics at two different locations the method (box 134) seeks to infer the prevalences of labels at two different locations, according to the Equation 15:

$$p(l^{(i)}, l^{(i-b)}) \qquad (15)$$

In that case the number of frequencies we have to count becomes 8*8=64 for our example of three recognizers carrying out the two-label task. Table 6 illustrates the possible events as:

TABLE 6

| Possible label voting patterns at two locations | |
|---|---|
| i | i-b |
| A, A, A | A, A, A |
| A, A, A | A, A, B |
| ... | ... |
| B, A, A | B, A, B |
| ... | ... |
| B, B, B | B, B, B |

Each of the $L^R L^R$ possible label voting patterns allows us to determine voting patterns for the locations (box 136) an inference equation, as set forth in Equation 16, $$f_{e^{(i)}, e^{(i-b)}} = \sum_{\ell_m, \ell_n} p(e^{(i)}, e^{(i-b)} | \ell_m, \ell_n) p(\ell_m, \ell_n) \qquad (16)$$

A step (box 138) in the process addresses whether this problem is solvable with independent recognizers? In order to provide the answer, the process needs to decompose the conditional recognition probabilities into products of the conditional recognition probabilities for each recognizer. The quantities to infer (box 138) for the quality of the recognizers, as set forth in Equation (17), are:

$$p(_r l_v^{(i)}, _r l_w^{(i-b)} | l_m^{(i)}, l_n^{(i-b)}) \qquad (17)$$

The quantity $_r l_v^{(i)}$ refers to the label $l_v$ produced by recognizer r at a location. The quantity $_r l_w^{(i-b)}$ refers to the label $l_w$ produced by recognizer r at a location b steps back. The true labels for those two locations are $l_m^{(i)}$ and $l_n^{(i-b)}$. In other words, this quantity answers the question: what is the probability that given that the sequence has the label $l_m$ at a location and that b steps back from that location it has label $l_n$ we would see recognizer r output the labels $l_v$ and $l_w$ for those two same locations?

The process (box 140) addresses how many of those conditional recognition probabilities are there for independent recognizers? A single recognizer can output one of $L^2$ possible label pairs for each correct pair. Such recognizer conditional recognition probability table would have $L^2$ entries, which must sum to one. Each recognizer is described by $L^2-1$ quantities for each possible correct pair for the two locations. This results in, as set forth in Equation (18), $$L^2 * (R*(L^2-1)) \qquad (18)$$

conditional probability parameters.

The prevalence of the correct location pairs requires $L^2$ parameters that must also sum to one so we need to determine $L^2-1$ linearly independent parameters. Adding them together, the process determines the correct labels from the gap inferred (box 142), as set forth in Equation 19, the following parameters $$(L^2-1)+L^2*(R(L^2-1))=(L^2-1)(R*L^2+1) \tag{19}$$

The gap between $L^{2R}-1$ and $(L^2-1)(R*L^2+1)$ allows for the introduction of models that capture the correlation between the recognizers, so given a sufficiently large number of recognizers, we can capture the correlations between them.

It is clear that this method can be repeated for multiple locations, for example, three different locations, not two as we have done here so far. In that three location case the equation becomes Equation 20

$$L^{3R}-1 \geq (L^3-1)(R*L^3+1) \tag{20}$$

and similar considerations apply. As a result, solutions for any sequential statistic can be obtained if enough data is obtained and to deploy using a sufficiently large number of recognizers. In operation, sequential statistics have a limitation based on limits in solving non-linear optimization problems having a large number of variables, i.e., in order to solve label triplets at least 175 parameters are needed. As a result, the present invention is implemented as a software program able to process non-linear optimization problems on the order of many thousand variables.

Determining the average accuracy from multiple recognizers According to another embodiment of the present invention, an inference aspect is utilized to provide an improved process of recognition that overcomes difficulties that occur when the possible outputs are large. According to the inference aspect, the process yields an inference for the average accuracy of recognizers operating on a large number of labels. The present invention addresses problems that occur in estimating the accuracy of recognizers performing the labelling task when they can produce a large number of labels. As set forth herein, to infer the prevalence of each of the correct labels, p(l), as well as the conditional recognition probabilities for each of the same labels.

For example, in DNA sequence data, we have only five labels: 4 labels for the A,C,G,T nucleotides and a fifth label to capture the deletion and insertion errors of the sequencers. The algorithm is carried out by setting up a system of polynomial equations. In the case of five labels, three recognizers require 125 equations to be considered. The number of equations we would need to solve when the number of labels is large would overwhelm any contemporary computer. For example, dictation speech recognizers can have on the order of 50,000 words in their recognition vocabulary. Speech recognizers can be recast as labellers: assigning a word (label) to a snippet of audio. Image recognizers also can be recast by assigning word (label) to the image, for example, identifying a number from an image. When the number of labels is 50,000, the number of equations that would need to be considered would be on the order $10^{14}$, a completely impractical number.

This invention solves this problem by offering an algorithm for calculating the average accuracy over all the labels. By abandoning the ability to state how accurate a recognizer can identify a particular label such as, for example, a sequence, word or image, the invention focuses on the ability to measure its average accuracy over all labels. This is accomplished by transforming the aligned recognition output of multiple recognizers to an abstract output that utilizes a much smaller number of labels. In general, no matter how many labels are potentially outputted by R recognizers, we can measure average accuracy by turning the problem into an abstract R+1 labelling task.

For purposes of illustration let us consider three recognizers, although later at least five recognizers are needed to implement the process. The following Table 5 shows a small portion of the recognition output for three recognizers. In operation, the method and system of inferring the accuracy of recognizers outputting a large number of labels for data sets according to an alternative embodiment of the present invention is applied to machine recognizers in a traffic monitoring field and, specifically, in the context of a traffic enforcement camera.

In this example to illustrate the present invention, traffic enforcement cameras are utilized in the context of automating the identification, reporting and ticketing of traffic violations presently found in automatic traffic ticketing machines used in enforcing stop lights, speed limits, and other traffic violations. Traffic enforcement cameras are typically part of a machine system using the camera and detector to identify violations and then output violation data to a software system that automates the process of recognizing license plates and identifying a particular vehicle involved in the identified traffic violation. The machine recognition system provides an output of a data set labeled so as to recognize the identity of a vehicle for traffic violations.

Any registered vehicle can be identified by its a license plate. The license plate displays a sequence of numbers and letters captured by the traffic enforcement camera. Once captured, the sequence of numbers and letters requires recognition. Systems for automating the process of recognizing license plates in an image, or multiple images of a vehicle, typically outputs data on its best guess at the correct license for the car. Like all machines, or automated recognizer systems, the best guess output is not always correct.

An important aspect of the present invention can be utilized in improving the accuracy of license plate recognizer system or machine. A system and method of improving the accuracy of recognizer systems would satisfy a need in the field and provide a commercial advantage. Measuring and quantifying the accuracy of different algorithms is an important aspect, for example, one may be interested in a global measure of accuracy to answer the question: how often does the machine recognizer or system output the correct license plate?

Unlike the recognition task according the first embodiment of the invention, quantifying the accuracy requires another aspect of the present invention. The task of identifying if a photograph contains a car, or not, is a simpler problem which could utilize the first embodiment of the present invention. The accuracy of recognizing the license plate has a larger number of possible outputs. For example, the State of Massachusetts database of vehicle registrations contains around 5 million licensed vehicles. As the possible outputs is large, using the techniques of the first embodiment of the present invention does not quantifiably improve accuracy as it requires that an estimation of the accuracy on each individual license plate.

This overall statistic quantifies how accurate plate recognizers are on average, without any knowledge of how accurate they are for any particular license plate. According to another embodiment of the present invention, illustrated in FIG. 11, the process determines an abstract set of labels for on the output of multiple license plate recognizers. The process determines a performance of each recognizer on these abstract labels so as to compute an average accuracy on the correctly correlated license plate to the particular vehicle according to the true record, for example, the vehicle registration in the State of Massachusetts database.

Accordingly the inference aspect is demonstrated where a data set is received (box 150), from at least these recognized (box 152) abstract labels are assigned for the output of three license plate recognizers (box 154) in the following example as tabulated in the following Table 7. At initialization, the correct output is unknown to the users of this process.

TABLE 7

Portion of the aligned output of three license plate recognizers

|  | Recognizer 1 | Recognizer 2 | Recognizer 3 | Correct |
|---|---|---|---|---|
| Vehicle 1 | BEF 6610 | BEE 6610 | EEF 6610 | BEE 6610 |
| Vehicle 2 | GBQ 7198 | GBQ 7198 | GBO 7158 | GBQ 7198 |
| Vehicle 3 | DAC 5487 | DEC 5481 | DAC 5487 | DEC 5487 |
| Vehicle 4 | FBA 1118 | FBA 5118 | FBB 5118 | FBA 1118 |
| Vehicle 5 | CDF 4926 | CDF 4926 | CDF 4926 | CDF 4926 |

The system proposed here can calculate the average accuracy of the recognizers without knowing anything about the correct license number of the image as represented in the right column of Table 7.

By way of example, humans perform the task of calculating the accuracy of the recognizers for current traffic violation recognition systems. A person is tasked with reviewing the recognition system output images used by the recognizers so as to identify the correct license plates in the images. By using the correct license plates, the accuracy of any one of these three recognizers can then be tabulated from the table by counting the number of times the recognizer is correct and computing the number as set forth in Equation 21:

$$\frac{\text{\# correct identifications}}{\text{\# identifications attempted}} \quad (21)$$

It would be advantageous to provide a system to calculate the accuracy of the recognizers for current traffic violation recognition systems.

Figure 11A:
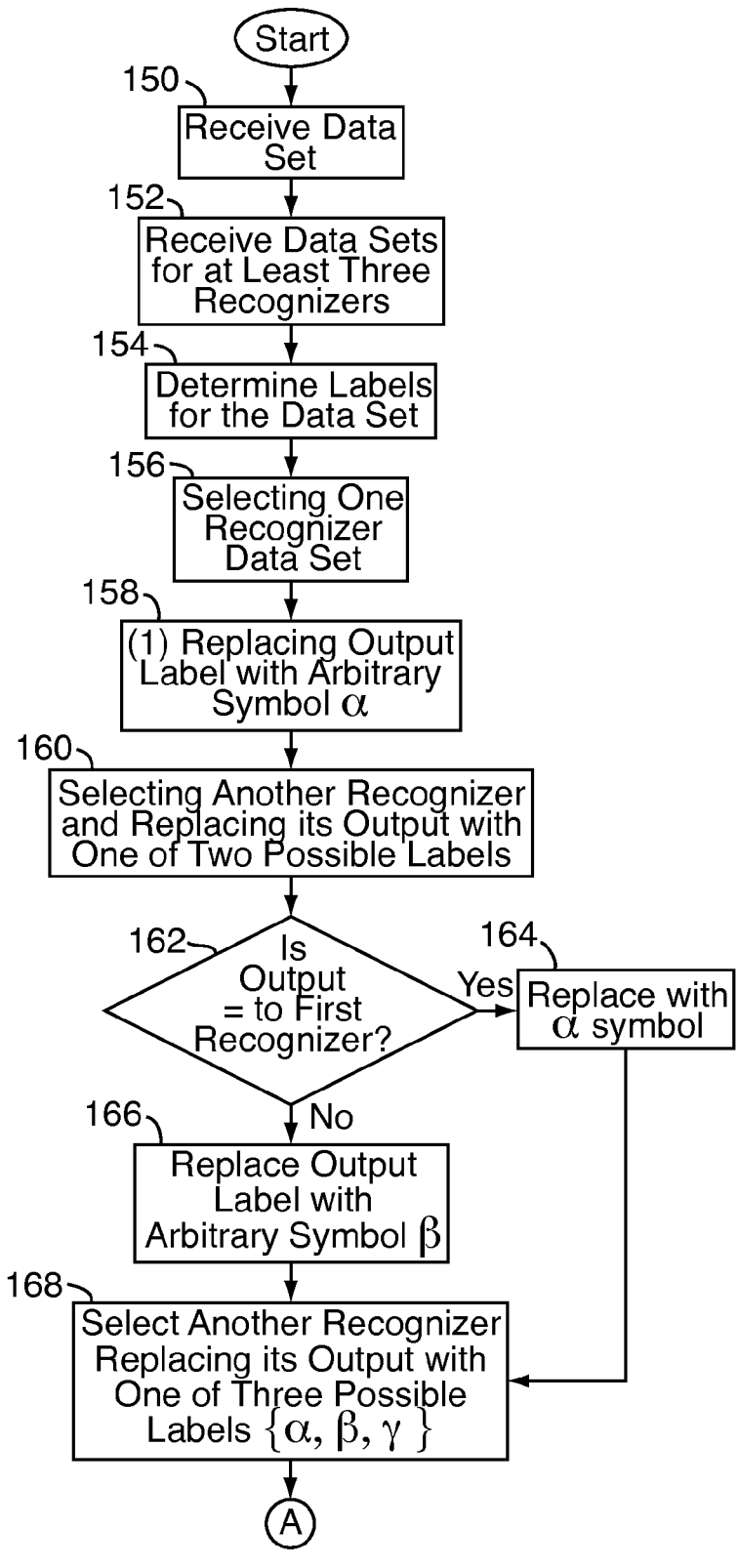
FIGS. 11a, 11b, and 11c illustrates a flow chart of an example of one embodiment of the method of the present invention for estimating the accuracy of recognizers outputting a large number of labels.
Figure 11B:
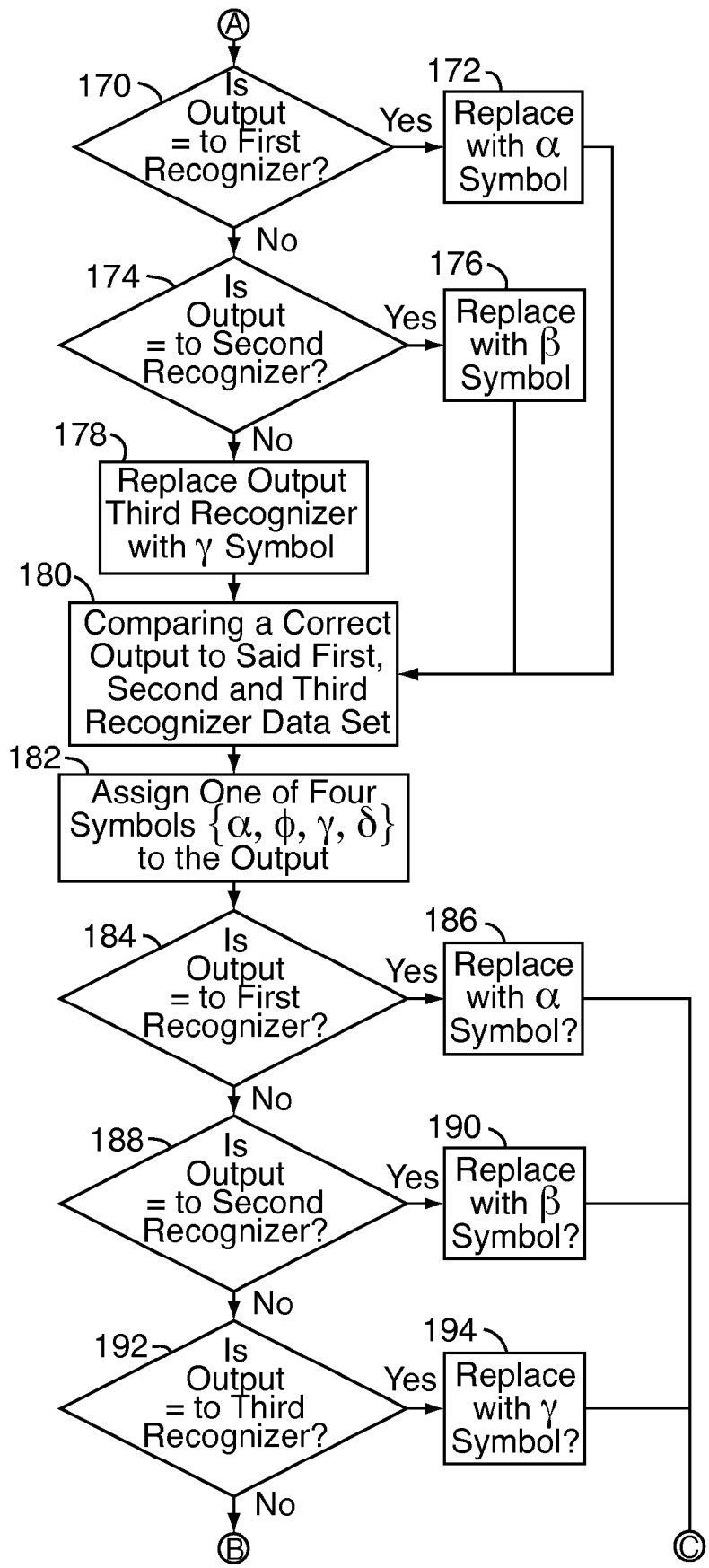
Figure 11C:
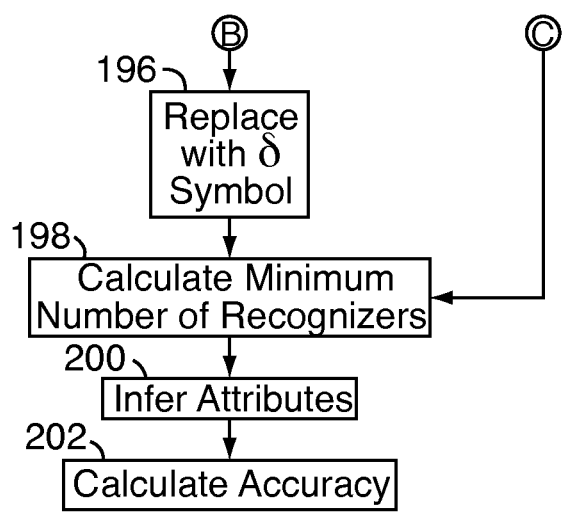

In contrast to the human review for accuracy, the average accuracy of a recognizer can be computed does not require any knowledge of the correct column to compute by the process of the present invention. The problem is mapped to an R+1 label problem as is described herein. As illustrated in FIG. 11, the process step (box 156) is to arbitrarily select one of the recognizers, for example, pick any of the recognizers as your reference. For purposes of illustration, we select the first recognizer—Recognizer 1. The transform is accomplished by replacing whatever label is outputted by the recognizer by an arbitrary, abstract label, here the Greek letter alpha, $\alpha$ (box 158). Accordingly Table 5 is transformed by assigning abstract label for the first Recognizer 1. Using of the recognizers output, Recognizer 1 data is transformed line-by-line by replacing the actual license numbers to the abstract symbol $\alpha$. Table 8 represents recognizers output is as follows,

TABLE 8

Portion of the aligned output of three recognizers where the output of the first recognizer replaced has been replaced by a single abstract label,

|  | Recognizer 1 | Recognizer 2 | Recognizer 3 | Correct |
|---|---|---|---|---|
| Vehicle 1 | $\alpha$ | BEE 6610 | EEF 6610 | BEE 6610 |
| Vehicle 2 | $\alpha$ | GBQ 7198 | GBO 7158 | GBQ 7198 |
| Vehicle 3 | $\alpha$ | DEC 5481 | DAC 5487 | DEC 5487 |
| Vehicle 4 | $\alpha$ | FBA 5118 | FBB 5118 | FBA 1118 |
| Vehicle 5 | $\alpha$ | CDF 4926 | CDF 4926 | CDF 4926 |

The second step of the process is to compare, by selecting another one of the recognizers and replacing its output with one of two possible labels (box 160). If its output is equal to the one that was originally created by the reference recognizer (the first one used that contains only the $\alpha$ label (box 162), then its output should be replaced by the same $\alpha$ label (box 164). If its output differs from the reference recognizer (box 162), it is replaced by a new abstract label, $\beta$ (box 166). Therefore, in this example, starting with vehicle 1, the output of Recognizer 2 with the value output of Recognizer 1. If the output values agree, Recognizer 2 data in the table is transformed into the same abstract label as Recognizer 1. If the output value of Recognizer 2 does not agree with Recognizer 1, the process assigns abstract label $\beta$ to the data of Recognizer 2 (box 168). Table 8 is now transformed to Table 9 looks as follows,

TABLE 9

Portion of the aligned output of three recognizers where the output of the first and second recognizers has been replaced by abstract labels

|  | Recognizer 1 | Recognizer 2 | Recognizer 3 | Correct |
|---|---|---|---|---|
| Vehicle 1 | $\alpha$ | $\beta$ | EEF 6610 | BEE 6610 |
| Vehicle 2 | $\alpha$ | $\alpha$ | GBO 7158 | GBQ 7198 |
| Vehicle 3 | $\alpha$ | $\beta$ | DAC 5487 | DEC 5487 |
| Vehicle 4 | $\alpha$ | $\beta$ | FBB 5118 | FBA 1118 |
| Vehicle 5 | $\alpha$ | $\alpha$ | CDF 4926 | CDF 4926 |

The third step of the process is to compare, starting with vehicle 1, the output of Recognizer 3 with the value each previous output, for example, the output of Recognizer 1, and the output of Recognizer 2. The transformation of the aligned outputs for this three recognizer output replaces the output of the third recognizer by three possible labels: the label $\alpha$ if its output equals that of the first (boxes 170, 172), the label $\beta$ if its output equals that of the second one (boxes 174, 176), and finally the label $\gamma$ if its output differs from either of the first two (box 178). In this example, if the output of Recognizer 3 agrees (box 170) and the value of Recognizer 1 the process assigns the abstract label $\alpha$ (box 172). If the output of Recognizer 3 agrees (box 174) and the value of Recognizer 2 the process assigns the abstract label $\beta$ (box 176). If the output value of Recognizer 3 does not agree with Recognizer 1 or Recognizer 2 data, the process assigns another abstract label $\gamma$ (box 178). The third step of the process proceeds, line by line, to replace the output of the third recognizer by one of three possible symbols: $\alpha$ if its output equals that of the first recognizer; $\beta$ if its output does not equal that of the first but agrees with the second recognizer; and $\gamma$ if its output does not agree with either of the first and second recognizer.

TABLE 10

Portion of the aligned output of three speech recognizers where the output of all three recognizers has been replaced by abstract labels.

|  | Recognizer 1 | Recognizer 2 | Recognizer 3 | Correct |
|---|---|---|---|---|
| Vehicle 1 | α | β | γ | BEE 6610 |
| Vehicle 2 | α | α | γ | GBQ 7198 |
| Vehicle 3 | α | β | α | DEC 5487 |
| Vehicle 4 | α | β | γ | FBA 1118 |
| Vehicle 5 | α | α | α | CDF 4926 |

The process, according to the present invention, can continue for additional transformations, even though the contents of the correct column is not known as it is possible to carry the same transformation on the correct column, or for additional sets of recognizer output data sets, using a fourth abstract label δ (boxes 180, 182, 184, 186, 188, 190, 192, 194 and 196). For example, comparing the correct output (box 180) and carrying this transformation one step further using four abstract symbols, {α, β, γ, δ}. The first three labels to be used in case the correct output equals one already outputted by any of the recognizers (boxes 184-194), and the final one δ (box 196), if the correct output is not present in the output of any of the three recognizers. The process results in transforming output values of data of the multi column output table, which could contain thousands of separate labels for each individual value, into a table containing 3 symbols, since the fourth column can contain another, different, symbol.

The problem is equivalent to a four-label. recognition problem. This means that we have transformed the recognition into an R+1 abstract label problem, independently of however many labels could be outputted by the recognizers. The transformation allows us to calculate the average accuracy over all the concrete labels (which can be in the order of thousands) in terms of the average accuracy over the (R+1) abstract labels. For example, the percentage of times that the first recognizer is correct is equal to the number of times that the label α appears in the correct column, $p(\alpha)$.

The process to solve the transformation is to proceed to establish under what conditions this (R+1)-label labelling task is solvable by R recognizers. This is done by calculating the minimum number of independent recognizers that can solve this problem. How many possible label patterns are observable? This sets the number of equations we will be able to use to solve this unsupervised inference problem. The first column only contains one label. The second column can contain two labels. Continuing in this manner we see that 1*2* . . . *R=R! patterns are observable after we transform the recognition outputs of the recognizers. The frequency of each of these patterns allows us to write a polynomial inference equation. Since the frequencies of the observable abstract label patterns must sum to one, we have R!−1 linearly independent equations available.

The average accuracy can be computed whenever the number of equations exceeds the number of parameters needed for the prevalence of the abstract labels and for modelling the conditional recognition probabilities. We proceed by counting how many parameters are needed to model the statistical quantities of interest when the recognizers produce labels independently (box 198). We have (R+1) labels and their prevalences sum to one so we need (R+1)−1=R parameters. The conditional recognition probabilities have a different structure for each of the recognizers.

For the first recognizer transformed, the conditional recognition probabilities are as set forth in Equation 22, $$\{p(\alpha|l)=1\}_{l\in\ell}.\quad(22)$$

In other words, by virtue of our transformation of the aligned outputs, the first recognizer always has output a no matter what the entry in the correct column. Therefore, no additional parameters are needed to capture these conditional recognition probabilities.

For the second recognizer transformed, the conditional recognition probabilities satisfy are as set forth in Equation 23, $$\{p(\alpha|l)+p(\beta|l)\}_{l\in\ell}.\quad(23)$$

There are (R+1) of these equations and for each one we have one linearly independent parameter. The process of the second independent recognizer requires (R+1) describing its conditional recognition probabilities.

Proceeding in this manner, we arrive at the general equation for the number of parameters needed to specify the conditional recognition probabilities of R independent recognizers are as set forth in Equation 24, $$\sum_{r=1}^{R}(r-1)(R+1) = (R+1)\left(\frac{R(R+1)}{2} - R\right) = (R+1)\frac{R(R-1)}{2}\quad(24)$$

Summing up the number of prevalence parameters for the abstract labels and the conditional recognition probabilities parameters for the independent recognizers (box 200) we obtain, as set forth in Equation 25, $$R+(R+1)\frac{R(R-1)}{2}\quad(25)$$

The problem of solving for the average accuracy of R independent recognizers is solvable, as set forth in Equation 26, whenever $$R! \geq R+(R+1)\frac{R(R-1)}{2}\quad(26)$$

Table 11 illustrates this occurs whenever R≥5,

TABLE 11

Comparison of the number of inference equations versus the number of parameters needed for independent recognizers

| R | R! | $R\left(\frac{R^2-1}{2}+1\right)$ |
|---|---|---|
| 2 | 2 | 5 |
| 3 | 6 | 15 |
| 4 | 24 | 34 |
| 5 | 120 | 115 |

The recognition accuracy (box 202) of the independent recognizers can then be calculated for each recognizer as follows:

For the first recognizer, as set forth in Equation 27, $$p_1(\alpha|\alpha)p(\alpha)=p(\alpha)\quad(27)$$

For the second recognizer, as set forth in Equation 28, $$\sum_{\ell\in\{\alpha,\beta\}} p_2(\ell|\ell)p(\ell)\quad(28)$$

For the third recognizer, as set forth in Equation 29, $$\sum_{\ell\in\{\alpha,\beta,\gamma\}} p_3(\ell|\ell)p(\ell)\quad(29)$$

And so on for the other recognizers. In this manner, the process can be used to solve for the average accuracy of each recognizer without specifying the accuracy for any one particular original label. Additionally, the process can estimate the percentage of times none of the recognizers produced the correct output, as set forth in Equation 30, $$p(lR+1) \tag{30}$$

In general, the gap between the number of linearly independent inference equations, R!−1, and the number of parameters needed for independent recognizers would allow for particular models of correlated recognition to also be solved. For example, for pair correlated recognition outputs, we can use six recognizers to solve for the average accuracy. In the case of speech or image recognition, the recognizers can produce deletion and insertion errors. When the recognition outputs are aligned the null label can be used. The procedure above is repeated keeping the identity of the null label, thereby allowing the process to not just calculate the total error but the substitution, insertion and deletion error rates for each recognizer. If the null label is kept, the problem becomes a (R+2)-label task. Considerations similar to those discussed above lead to the following statements.

The number of observable label patterns is (R+1)! The number of parameters needed to characterize the conditional recognition probabilities is represented by the Equation 31, $$(R+1)\left(1 + \frac{R(R+2)}{2}\right) \tag{31}$$

Whenever the number of recognizers becomes R≥4 this (R+2) label task is solvable with independent recognizers. The different error rates for the first recognizer are now expressed by the Equation 32, $$e_{substitution} = \sum_{\ell \notin \{\alpha, \mathcal{N}\}} p(\alpha \mid \ell) p(\ell) \tag{32}$$

$$e_{deletion} = p(\mathcal{N} \mid \alpha) p(\alpha)$$

$$e_{insertion} = p(\alpha \mid \mathcal{N}) p(\mathcal{N})$$

When using an algebraic algorithm for solving inference equations, such as, for example, a Buchberger's algorithm, as there is no need to explicitly eliminate variables to remain with an independent set. Instead, all statistical variables are used and the number of equations is expanded beyond the label voting event equations to include the normalization equations.

In the case of completely independent recognizers, the number of statistical variables that need to be inferred is calculated by adding the number of prevalence values that are present (possibly including a Null label), l, with the number of conditional probabilities for each recognizer given a label, r*l*l, for a total of 1+r*l*l or (1+r*l)*l.

The number of equations available are: one equation for the normalization of the prevalences, r*l equations for the normalization of the conditional recognition probabilities of each of the recognizers, and l$^r$ label voting event equations. In total, 1+r*l+l$^r$ equations.

Setting these two equations equal to each other, as shown below, allows the minimum number of recognizers, r_min, to be solved as follows:
Equation 33: The Minimum Number of Recognizers, r_min, in Terms of the Number of Labels, l:

$$l^{r\_min} + r\_min * l + 1 \geq (1 + r\_min * l) * (l). \tag{33}$$

By solving for r_min in Equation 1, above, it is known that the value of r_min must be equal to or greater than three (3) for any number of labels (i.e., given that l must be greater than or equal to two (2), since a binary labeling scheme is the most minimally informative labeling scheme possible).

However, in some contexts, more than three (3) recognizers may be required, for instance, if the recognizers are partially or fully interdependent and based on the number of labels applied to the data set, including the Null label in the case of recognizers producing deletion and insertion errors when processing sequential data, and the selected model. In these contexts, the recognizers would not produce uncorrelated labeling decisions.

For example, in the context of document relevance detection, there is two-label recognition (i.e., relevant or not-relevant) and, thus, one independent prevalence parameter. In this context, the data set is sequential but only subject to substitution errors (i.e., each document is readily observable and the only possible error is whether the recognizer correctly determined the relevance of that document). Assuming the selection of a two-recognizer correlation factor and that there must be as many pair correlation parameters as there are pairs of recognizers, the number of parameters needed to model the conditional probability of recognizing the labels is as follows: Equations 34, 35 and 36: total number of parameters needed to model conditional probability in the context of document relevance detection:

$$1 + 1 * \left(l * r + \frac{r * (r-1)}{2}\right), \tag{34}$$

$$2 + (2)\left((2) * r + \frac{r * (r-1)}{2}\right), \tag{35}$$

$$2 + 3 * r + r^2. \tag{36}$$

The number of equations available are the l$^r$ label voting event equations, one equation for the normalization of the prevalence variables and two equations for the normalization of the conditional recognition variables of the recognizers Equations 37, 38: total number of equations available in the context of document relevance detection:

$$l^r + 3, \tag{37}$$

$$2^r + 3. \tag{38}$$

Since the total number of equations must be greater than the total number of parameters needed to model the conditional probabilities, the minimum number of recognizers can be estimated by comparing Equation 34-36 to Equation 37-38 for a given number recognizers, as shown in the following Table 12.

TABLE 12 minimum number of recognizers, r_min

| Number of Recognizers | Number of Equations | Number of Model Parameters |
|---|---|---|
| R | $2^r + 3$ | $2 + 3 * r + r^2$ |
| 3 | 11 | 20 |
| 4 | 19 | 30 |
| 5 | 35 | 42 |
| 6 | 67 | 56 |
| 7 | 131 | 72 |

Table 12 shows that the minimum number of recognizers required to solve for the statistical parameters of the document relevance detection model is six (6). For five or fewer recognizers, there is an insufficient number of observable events to solve for each of the parameters.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method of executing a computer program using a processor of a user terminal to infer attributes of a data set or attributes of a plurality of recognizers configured to label the data set, the method comprising the steps of:
  receiving, by the processor, the data set as labeled data set having tallies of each of a plurality of label voting patterns, each of the label voting patterns representing a combination of labels, each of the labels within the combination resulting from analysis of the data set by a different recognizer of the plurality, each of the tallies representing the number of times that a particular label voting pattern resulted from analysis of the data set by the plurality of recognizers;
  constructing, by the processor, an inference equation for each of the plurality of label voting patterns in terms of statistical parameters and the tallies, wherein the statistical parameters indicate a probability of an observable event in the labeled data set;
  calculating, by the processor, values for the statistical parameters based on the inference equation for each of the plurality of label voting patterns; and
  calculating, by the processor, the attributes of the data set or the attributes of the plurality of recognizers based on the values of the statistical parameters.

2. The method of claim 1, further comprising:
  estimating a minimum number of recognizers required to infer the attributes of the data set or the recognizers, the step of estimating comprising:
    receiving a number of labels that can be applied to the data set by the recognizers, wherein the number of labels includes a Null label when applicable;
    receiving a number of recognizers that are to be correlated in a grouping of the recognizers in order to infer the attributes of the data set or the recognizers, wherein the correlation of the grouping of the recognizers relates to a conditional probability of the recognizers in the grouping of recognizers agreeing with each other about the label to apply to a data point of the data set; and
    determining the minimum number of recognizers based on the number of labels that can be applied to the data set by the recognizers and the number of recognizers that are to be correlated in the grouping of the recognizers.

3. The method of claim 1, wherein the step of calculating values for the statistical parameters compensates for a probability of unobservable events in the labeled data set.

4. The method of claim 3, further comprising:
  compensating for a probability of unobservable events in a labeled data set, the step of compensating for a probability of the unobservable events in the labeled data set comprising:
    wherein the labeled data set has at least one instance of each label voting pattern except an all-Null label voting pattern, wherein the labeled data set was labeled by at least four recognizers;
    projecting out a portion of the labeled data set associated with one or more of the at least four recognizers from the labeled data set to produce a reduced data set, wherein the reduced data set includes at least one instance of an all-Null label voting pattern of the reduced data set that is observable relative to at least one associated non-Null label voting pattern of the projected out portion of the labeled data set;
    calculating a probability of the all-Null label voting pattern of the labeled data set based on the at least one instance of the all-Null label voting pattern of the reduced data set; and
    modifying the inference equation for each of the label voting patterns to compensate for the probability of the all-Null label voting pattern of the labeled data set;
  wherein the values of the statistical parameters are calculated based on the inference equation for each of the label voting patterns of the reduced data set.

5. The method of claim 3, further comprising:
  compensating for a probability of unobservable events in a labeled data set, the step of compensating for the probability of unobservable events comprising:
    wherein the labeled data set has at least one instance of each label voting pattern except an all-Null label voting pattern, wherein the labeled data set was labeled by at least three recognizers;
    calculating a correction factor by summing the inference equations for each of the label voting patterns; and
    constructing a corrected inference equation of the labeled data set based on the inference equation for each of the label voting patterns and the correction factor;
  wherein the values of the statistical parameters are calculated based on the corrected inference equation for each of the label voting patterns.

6. The method of claim 1, further comprising:
  ensuring receipt of a minimum number of recognizers required to infer the attributes of the data set or the recognizers, the step of ensuring further comprising:
    receiving at least three recognizers;
    determining a plurality of concurrence factors for pairings of the recognizers that have been received;
    calculating an effective number of recognizers that have been received based on the plurality of concurrence factors;
    determining whether the effective number of recognizers is less than the minimum number of recognizers; and, if so,
    receiving at least one additional recognizer.

7. The method of claim 1, wherein the step of receiving the labeled data set further comprises:
  receiving at least two recognizers using the processor of the user terminal, wherein the user terminal is selected from the group consisting of: a computer and a mobile device;
  receiving the data set from a device that is in communication with the user terminal, wherein the device is selected from the group consisting of: laboratory test equipment, video equipment, audio equipment, a data archive and a sensor;
  separately labeling the data set using the at least two recognizers, wherein the data set that is separately labeled defines a portion of the labeled data set;
  when one or more of the at least two recognizers is a human judge comparing another label as labeled by the human judge for the same data set to an existing label for same data set, wherein the another label that was labeled by the human judge defines another portion of the same data set;

aligning the labeled data set that was labeled by each of the recognizers;

when the data set is sequential, inserting at least one Null label into the data set that is separately labeled and aligned; and counting each instance of each of the plurality of label voting patterns to produce the tallies.

8. The method of claim 1, further comprising:

receiving a selection of a model, wherein the model includes a specification selected from the group consisting of: using n-recognizer correlation factors to measure and account for dependencies between the recognizers, using a selected approach to compensate for the effect of unobservable events on the statistical model and using a particular optimization equation to solve the statistical model; and receiving a selection of a mode of operation, the mode of operation includes a specification selected from the group consisting of: operating the method to achieve a desired output, using a batch-based approach and configuring an output of the method.

9. The method of claim 1, receiving a selection of a model, wherein the model includes a specification selected from the group consisting of: using n-recognizer correlation factors to measure and account for dependencies between the recognizers, using a selected approach to compensate for the effect of unobservable events on the statistical model and using a particular algebraic optimization equation to solve the statistical model; and receiving all the solutions of the optimization equations rather than a single solution for the statistical model selection of a mode of operation.

10. The method of claim 1, further comprising:

determining whether each possible label voting pattern is observable in the labeled data set; and, if not, gathering or prompting for an additional data set or a selection of a change to a model; and receiving one or more of the additional data set or the selection of the change of the model.

11. The method of claim 10, further comprising:

separately labeling, using the plurality of recognizers, the additional data set; and aligning the additional data set to the labeled data set;

inserting at least one Null label into the additional data set or the labeled data set where the plurality of recognizers have deletion or insertion errors; and counting each instance of each of the plurality of label voting patterns to produce the tallies.

12. The method of claim 1, wherein the observable event indicated by the statistical parameter is an instance selected from the group consisting of: one of the recognizers applying a label to the labeled data set when the true or correct label to be applied to the labeled data set is one of the labels, and two or more of the recognizers both applying a same label to the labeled data set with each other when the true or correct label to be applied to the labeled data set is one of the labels.

13. The method of claim 1, wherein the step of constructing the inference equation further comprises:

substituting an expression based on the probability of the applied, non-Null labels for an expression of a probability of the Null-label in each of the inference equations.

14. The method of claim 1, wherein the step of constructing the inference equation further comprises:

substituting an expression based on the statistical parameters and the probability of the labels for an expression of a probability of non-Null labels in each of the inference equations.

15. The method of claim 1, wherein the attributes are selected from the group consisting of: an actual prevalence of each label including the Null label, an inferred prevalence of each label including the Null label, an inferred prevalence of the all-Null label voting pattern, a confidence measure of each label applied by each of the plurality of recognizers, an inferred length of the data set, a substitution error rate of each recognizer, an insertion error rate of each recognize and a deletion error rate of each recognizer.

16. The method of claim 15, further comprising:

outputting the attributes that are calculated.

17. A method of executing a computer program using a processor of a user terminal to infer attributes of a data set and attributes of a plurality of recognizers configured to label the data set, the method comprising the steps of:

receiving, by the processor, the data set as labeled data set having tallies of a plurality of label voting patterns, each of the label voting patterns representing a combination of labels, each of the labels within the combination resulting from analysis of the data set by a different recognizer of the plurality, each of the tallies representing the number of times that a particular label voting pattern resulted from analysis of the data set by the plurality of recognizers;

constructing, by the processor, an inference equation for each of the plurality of label voting patterns in terms of statistical parameters and the tallies, wherein the statistical parameters indicate a probability of an observable event in the labeled data set;

calculating, by the processor, values for the statistical parameters based on the inference equation for each of the plurality of label voting patterns;

calculating, by the processor, the attributes of the data set and the attributes of the plurality of recognizers based on the values of the statistical parameters; and wherein the attributes of the data set include at least one of: a prevalence of each label; an inferred prevalence of each label, an inferred prevalence of an all-Null label voting pattern, a confidence measurement of each label applied by each of the plurality of recognizers; an inferred length of the data set; and the attributes of the plurality of recognizers include at least one of: a substitution error rate of each recognizer; an insertion error rate of each recognizer; and a deletion error rate of each recognizer.

* * * * *